US010326758B2

(12) United States Patent
Nakajima

(10) Patent No.: US 10,326,758 B2
(45) Date of Patent: Jun. 18, 2019

(54) SERVICE PROVISION SYSTEM, INFORMATION PROCESSING SYSTEM, INFORMATION PROCESSING APPARATUS, AND SERVICE PROVISION METHOD

(71) Applicant: Masato Nakajima, Kanagawa (JP)

(72) Inventor: Masato Nakajima, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 188 days.

(21) Appl. No.: 15/172,371

(22) Filed: Jun. 3, 2016

(65) Prior Publication Data

US 2016/0359849 A1 Dec. 8, 2016

(30) Foreign Application Priority Data

Jun. 8, 2015 (JP) .................. 2015-115433

(51) Int. Cl.
*H04L 29/06* (2006.01)
(52) U.S. Cl.
CPC .................. *H04L 63/0853* (2013.01)
(58) Field of Classification Search
CPC .................................................. H04L 63/0853
See application file for complete search history.

(56) References Cited

U.S. PATENT DOCUMENTS

| 7,315,829 B1* | 1/2008 | Tagawa | G06F 21/10 705/26.1 |
| 7,444,368 B1* | 10/2008 | Wong | G06F 21/31 709/200 |
| 7,607,012 B2* | 10/2009 | Nyberg | H04L 9/0844 380/33 |
| 7,681,229 B1* | 3/2010 | Ebrahimi | H04L 63/0281 709/229 |
| 8,321,917 B2* | 11/2012 | Kikkawa | H04L 63/08 713/161 |
| 8,572,701 B2* | 10/2013 | Rathbun | H04L 63/18 705/67 |

(Continued)

FOREIGN PATENT DOCUMENTS

| JP | 2005-227891 | 8/2005 |
| JP | 2005-346571 | 12/2005 |
| JP | 2014-089680 | 5/2014 |

*Primary Examiner* — David Garcia Cervetti
(74) *Attorney, Agent, or Firm* — Harness, Dickey & Pierce, P.L.C.

(57) ABSTRACT

A service provision system includes a processor configured to provide a predetermined service based on first authentication information issued by an external first authentication unit. The processor is configured to implement a notification unit that sends to a user of the predetermined service a notification of third authentication information for obtaining second authentication information different from the first authentication information, an issue unit that issues the second authentication information in response to an issue request of the second authentication information including the third authentication information, and a second authentication unit that verifies authenticity of a use request of the predetermined service including one of the first authentication information and the second authentication information.

14 Claims, 20 Drawing Sheets

(56) References Cited

U.S. PATENT DOCUMENTS

| | | | | |
|---|---|---|---|---|
| 8,578,466 B2* | 11/2013 | Imai | H04L 63/0876 | 726/10 |
| 8,646,060 B1* | 2/2014 | Ben Ayed | H04L 63/0853 | 726/9 |
| 8,782,804 B2* | 7/2014 | Nagai | G06F 21/44 | 726/28 |
| 8,843,113 B2* | 9/2014 | Takamura | H04W 12/06 | 455/411 |
| 8,892,887 B2* | 11/2014 | Perez | H04L 9/0869 | 709/224 |
| 8,913,270 B2* | 12/2014 | Yano | H04N 1/00854 | 358/1.14 |
| 9,112,678 B2* | 8/2015 | Nakano | H04L 9/0822 | |
| 9,445,270 B1* | 9/2016 | Bicket | H04W 12/06 | |
| 9,619,770 B2* | 4/2017 | Bisroev | G06Q 10/06316 | |
| 9,619,771 B2* | 4/2017 | Rao | G06Q 10/06316 | |
| 9,641,504 B2* | 5/2017 | Stevens | H04L 63/08 | |
| 9,641,525 B2* | 5/2017 | Kall | H04L 12/4633 | |
| 9,644,399 B2* | 5/2017 | Johnson | E05B 47/0001 | |
| 9,647,996 B2* | 5/2017 | Johnson | H04L 63/0428 | |
| 9,672,336 B1* | 6/2017 | Spence | G06F 21/32 | |
| 9,721,410 B2* | 8/2017 | Ito | G07C 9/00158 | |
| 9,892,408 B2* | 2/2018 | Choi | G06Q 20/40 | |
| 10,027,680 B1* | 7/2018 | Saylor | H04L 63/08 | |
| 10,073,958 B2* | 9/2018 | Spence | G06F 21/31 | |
| 2002/0035690 A1* | 3/2002 | Nakano | H04L 9/3271 | 713/171 |
| 2002/0046353 A1* | 4/2002 | Kishimoto | H04L 63/0442 | 726/28 |
| 2002/0114469 A1* | 8/2002 | Faccin | H04L 9/3271 | 380/270 |
| 2002/0138761 A1* | 9/2002 | Kanemaki | G06F 21/33 | 726/7 |
| 2002/0156906 A1* | 10/2002 | Kadyk | H04L 63/0281 | 709/229 |
| 2003/0097593 A1* | 5/2003 | Sawa | G06F 21/31 | 726/4 |
| 2003/0134615 A1* | 7/2003 | Takeuchi | G06Q 20/02 | 455/411 |
| 2003/0167183 A1* | 9/2003 | Kido | G06Q 10/063112 | 705/7.14 |
| 2004/0006713 A1* | 1/2004 | Minemura | H04L 9/3273 | 726/29 |
| 2004/0117320 A1* | 6/2004 | Morioka | G06Q 20/04 | 705/76 |
| 2004/0148186 A1* | 7/2004 | Kawashima | G06Q 20/204 | 705/17 |
| 2004/0162998 A1* | 8/2004 | Tuomi | H04L 63/083 | 726/3 |
| 2004/0255112 A1* | 12/2004 | Choi | H04L 9/32 | 713/155 |
| 2004/0255243 A1* | 12/2004 | Vincent, III | G06F 17/2247 | 713/170 |
| 2005/0273609 A1* | 12/2005 | Eronen | H04L 63/0428 | 713/171 |
| 2005/0289643 A1* | 12/2005 | Sato | H04L 63/0407 | 726/4 |
| 2006/0092461 A1* | 5/2006 | Kitada | G06F 3/1222 | 358/1.15 |
| 2006/0112269 A1* | 5/2006 | Uh | H04L 63/0227 | 713/166 |
| 2006/0155993 A1* | 7/2006 | Busboon | G06F 21/31 | 713/169 |
| 2006/0206925 A1* | 9/2006 | Dillaway | G06F 21/33 | 726/5 |
| 2006/0221932 A1* | 10/2006 | Iwatsu | H04H 20/82 | 370/352 |
| 2006/0276124 A1* | 12/2006 | Kikkoji | H04H 40/18 | 455/3.01 |
| 2006/0294562 A1* | 12/2006 | Kikkoji | H04H 20/82 | 725/105 |
| 2007/0005435 A1* | 1/2007 | Murase | G06Q 30/02 | 705/26.1 |
| 2007/0006272 A1* | 1/2007 | Kikkoji | H04H 60/42 | 725/100 |
| 2007/0040651 A1* | 2/2007 | Jung | H04L 63/08 | 340/5.74 |
| 2007/0044146 A1* | 2/2007 | Murase | G06F 21/33 | 726/10 |
| 2007/0101126 A1* | 5/2007 | Choi | H04L 9/3226 | 713/156 |
| 2007/0186104 A1* | 8/2007 | Suzuki | H04L 63/08 | 713/168 |
| 2007/0283431 A1* | 12/2007 | Ueda | G06F 21/32 | 726/19 |
| 2008/0040787 A1* | 2/2008 | Aso | H04L 63/08 | 726/11 |
| 2008/0046720 A1* | 2/2008 | Sugishita | G06F 21/629 | 713/156 |
| 2008/0098466 A1* | 4/2008 | Yoshida | G06F 21/35 | 726/5 |
| 2008/0108307 A1* | 5/2008 | Yeh | G01S 5/0252 | 455/41.2 |
| 2008/0114982 A1* | 5/2008 | Bleumer | G07B 17/00733 | 713/171 |
| 2009/0119763 A1* | 5/2009 | Park | H04L 63/0815 | 726/8 |
| 2009/0183256 A1* | 7/2009 | Mo | G06F 12/1466 | 726/21 |
| 2009/0237206 A1* | 9/2009 | Anderson | B60R 25/23 | 340/5.72 |
| 2010/0017334 A1* | 1/2010 | Itoi | G06Q 20/02 | 705/71 |
| 2010/0079243 A1* | 4/2010 | Hamada | G06F 21/32 | 340/5.83 |
| 2010/0146611 A1* | 6/2010 | Kuzin | G06F 21/41 | 726/8 |
| 2010/0262703 A1* | 10/2010 | Faynberg | H04L 63/0815 | 709/229 |
| 2010/0268954 A1* | 10/2010 | Pang | H04L 9/0847 | 713/171 |
| 2011/0086678 A1* | 4/2011 | Suzuki | H04M 1/6091 | 455/569.2 |
| 2011/0177780 A1* | 7/2011 | Sato | H04W 36/14 | 455/41.1 |
| 2011/0258697 A1* | 10/2011 | Ikeda | G06F 21/31 | 726/16 |
| 2011/0264916 A1* | 10/2011 | Fischer | G07C 5/008 | 713/175 |
| 2011/0296190 A1* | 12/2011 | Paeschke | B60R 13/10 | 713/176 |
| 2012/0007712 A1* | 1/2012 | Tung | B60R 25/243 | 340/5.72 |
| 2012/0100806 A1* | 4/2012 | Hall | B60R 25/24 | 455/41.2 |
| 2012/0192264 A1* | 7/2012 | Sugiyama | G03G 15/5091 | 726/16 |
| 2012/0198539 A1* | 8/2012 | Liu | H04W 12/06 | 726/9 |
| 2012/0265990 A1* | 10/2012 | Liu | H04W 12/06 | 713/168 |
| 2012/0291106 A1* | 11/2012 | Sasaki | G06F 21/556 | 726/5 |
| 2012/0297458 A1* | 11/2012 | Tom | G06F 21/445 | 726/4 |
| 2012/0310447 A1* | 12/2012 | Toki | B60R 25/24 | 701/2 |
| 2013/0036231 A1* | 2/2013 | Suumaki | H04W 12/04 | 709/228 |
| 2013/0057900 A1* | 3/2013 | Ohta | G06K 15/00 | 358/1.14 |
| 2013/0061319 A1* | 3/2013 | Yasuhara | G06F 21/41 | 726/19 |
| 2013/0099892 A1* | 4/2013 | Tucker | G07C 9/00309 | 340/5.61 |
| 2013/0281021 A1* | 10/2013 | Palin | H04W 8/005 | 455/41.2 |

(56) References Cited

U.S. PATENT DOCUMENTS

| | | | |
|---|---|---|---|
| 2013/0293349 A1* | 11/2013 | Templ | G07C 9/00111 340/5.61 |
| 2013/0305028 A1* | 11/2013 | Mo | G06F 12/1408 713/2 |
| 2013/0326608 A1* | 12/2013 | Uchida | H04L 63/0815 726/8 |
| 2014/0064486 A1* | 3/2014 | Abraham | H04W 12/04 380/270 |
| 2014/0079217 A1* | 3/2014 | Bai | H04L 63/0869 380/270 |
| 2014/0122349 A1* | 5/2014 | Takatsu | G06Q 30/018 705/317 |
| 2014/0123271 A1* | 5/2014 | Ishii | H04N 1/00244 726/16 |
| 2014/0169564 A1* | 6/2014 | Gautama | G07C 9/00309 380/270 |
| 2014/0180923 A1* | 6/2014 | Choi | G06Q 20/42 705/44 |
| 2014/0188348 A1* | 7/2014 | Gautama | B60W 10/30 701/48 |
| 2014/0189796 A1* | 7/2014 | Mashimo | G06F 21/305 726/3 |
| 2014/0232569 A1* | 8/2014 | Skinder | G01C 21/16 340/989 |
| 2014/0232570 A1* | 8/2014 | Skinder | G01C 21/165 340/989 |
| 2014/0274013 A1* | 9/2014 | Santavicca | H04W 4/008 455/418 |
| 2014/0378057 A1* | 12/2014 | Ramon | H04L 9/32 455/41.2 |
| 2015/0072650 A1* | 3/2015 | Xia | H04W 12/06 455/411 |
| 2015/0092223 A1* | 4/2015 | Ohara | H04N 1/4433 358/1.14 |
| 2015/0106918 A1* | 4/2015 | Yamada | G06F 21/45 726/18 |
| 2015/0163854 A1* | 6/2015 | Lee | H04W 4/008 370/328 |
| 2015/0177362 A1* | 6/2015 | Gutierrez | B60R 25/245 701/519 |
| 2015/0188704 A1* | 7/2015 | Takenaka | H04L 9/0869 713/171 |
| 2015/0206139 A1* | 7/2015 | Lea | G06Q 20/02 705/44 |
| 2015/0339334 A1* | 11/2015 | Hanke | G06F 17/30725 707/736 |
| 2015/0341356 A1* | 11/2015 | Dong | H04L 63/0884 726/7 |
| 2015/0350176 A1* | 12/2015 | Mabuchi | H04L 9/3271 726/6 |
| 2015/0358814 A1* | 12/2015 | Roberts | H04W 12/06 713/169 |
| 2015/0371026 A1* | 12/2015 | Gnanasekaran | G06F 21/35 726/7 |
| 2015/0379516 A1* | 12/2015 | Yingst | G06Q 20/4014 705/44 |
| 2016/0012653 A1* | 1/2016 | Soroko | G07C 9/00007 340/5.61 |
| 2016/0050699 A1* | 2/2016 | Boss | H04W 67/12 455/41.2 |
| 2016/0065572 A1* | 3/2016 | Kim | H04L 63/0861 726/7 |
| 2016/0080357 A1* | 3/2016 | Daman | H04L 63/083 726/7 |
| 2016/0080940 A1* | 3/2016 | Pang | H04W 4/008 455/411 |
| 2016/0100310 A1* | 4/2016 | Lee | H04L 63/0853 713/171 |
| 2016/0150352 A1* | 5/2016 | Saed | H04W 4/008 455/41.2 |
| 2016/0225211 A1* | 8/2016 | Gehin | G07C 9/00309 |
| 2016/0234594 A1* | 8/2016 | Ogura | H04R 1/086 |
| 2016/0253657 A1* | 9/2016 | Sohn | G06Q 20/3227 705/44 |
| 2016/0259933 A1* | 9/2016 | Sugimura | G06F 21/629 |
| 2016/0294796 A1* | 10/2016 | Hidayat | H04L 63/08 |
| 2016/0315772 A1* | 10/2016 | McCallum | H04L 9/0844 |
| 2016/0353305 A1* | 12/2016 | Zakaria | H04W 24/10 |
| 2016/0358389 A1* | 12/2016 | Menard | G07C 9/00309 |
| 2016/0360402 A1* | 12/2016 | Park | H04W 12/02 |
| 2017/0019378 A1* | 1/2017 | Johnson | H04L 63/0428 |
| 2017/0163622 A1* | 6/2017 | Asano | H04L 9/32 |

* cited by examiner

FIG.6A

| TENANT ID | USER ID | PASSWORD | ROLE | EMAIL ADDRESS | ... | LAST NAME | FIRST NAME | LANGUAGE |
|---|---|---|---|---|---|---|---|---|
| 00001 | aaa | AAA | ADMINISTRATOR | A@aaa.com | ... | aaa | xxx | JAPANESE |
| | bbb | BBB | USER | B@aaa.com | ... | bbb | yyy | |
| | ccc | CCC | USER | C@aaa.com | ... | ccc | zzz | |
| 00002 | ddd | DDD | ADMINISTRATOR | D@bbb.com | ... | ddd | vvv | ENGLISH |
| | eee | EEE | USER | E@bbb.com | ... | eee | www | |
| ... | ... | ... | ... | ... | ... | ... | ... | ... |

FIG.6B

| TENANT ID | TENANT NAME | COUNTRY NAME | AUTHENTICATION SYSTEM |
|---|---|---|---|
| 00001 | FIRM-A | JAPAN | AD |
| 00002 | FIRM-B, OVERSEAS | U.S. | EXTERNAL |
| 00003 | FIRM-B, DOMESTIC | JAPAN | NSP |
| ... | ... | ... | ... |

FIG.6C

| TENANT ID | DEVICE AUTHENTICATION INFO. | FUNCTION INFO. | ... |
|---|---|---|---|
| 00001 | 111 | MFP | ... |
| | 222 | COPIER | ... |
| | 333 | IWB | ... |
| 00002 | 444 | PRINTER | ... |
| ... | ... | ... | ... |

FIG.7A  /504

| INTERNAL ID | TENANT ID | USER ID | TEMPORARY CODE | TEMPORARY PASSWORD | START DATE AND TIME | END DATE AND TIME |
|---|---|---|---|---|---|---|
| xxx0001 | 00001 | aaa | En2EiwjXVQXDAdscornm7t8B3gEHAUEpm | NFsgsHDt | 20xx/01/01 15:00 | 20xx/01/01 18:00 |
| xxx0002 | 00001 | bbb | Fm3FjxkYXRYEBeldpson8u9C4fFlBRFqn | MGthtlEu | 20xx/01/01 15:00 | 20xx/01/01 18:00 |
| xxx0003 | 00001 | ccc | BRFqnFm3FjxkYXRYEBeldpson8u9C4fFl | tIEuMGth | 20xx/01/01 15:00 | 20xx/01/01 18:00 |
| ⋮ | ⋮ | ⋮ | ⋮ | ⋮ | ⋮ | ⋮ |

FIG.7B  /505

| TENANT ID | USER ID | AUTH. TICKET ID | INTERNAL ID | EXPIRY DATE |
|---|---|---|---|---|
| 00001 | aaa | xxxxxxx | xxx0001 | 20xx/01/01 18:00 |
| | bbb | yyyyyyy | xxx0002 | 20xx/01/01 18:00 |
| | ccc | zzzzzzz | xxx0003 | 20xx/01/01 18:00 |
| ⋮ | ⋮ | ⋮ | ⋮ | ⋮ |

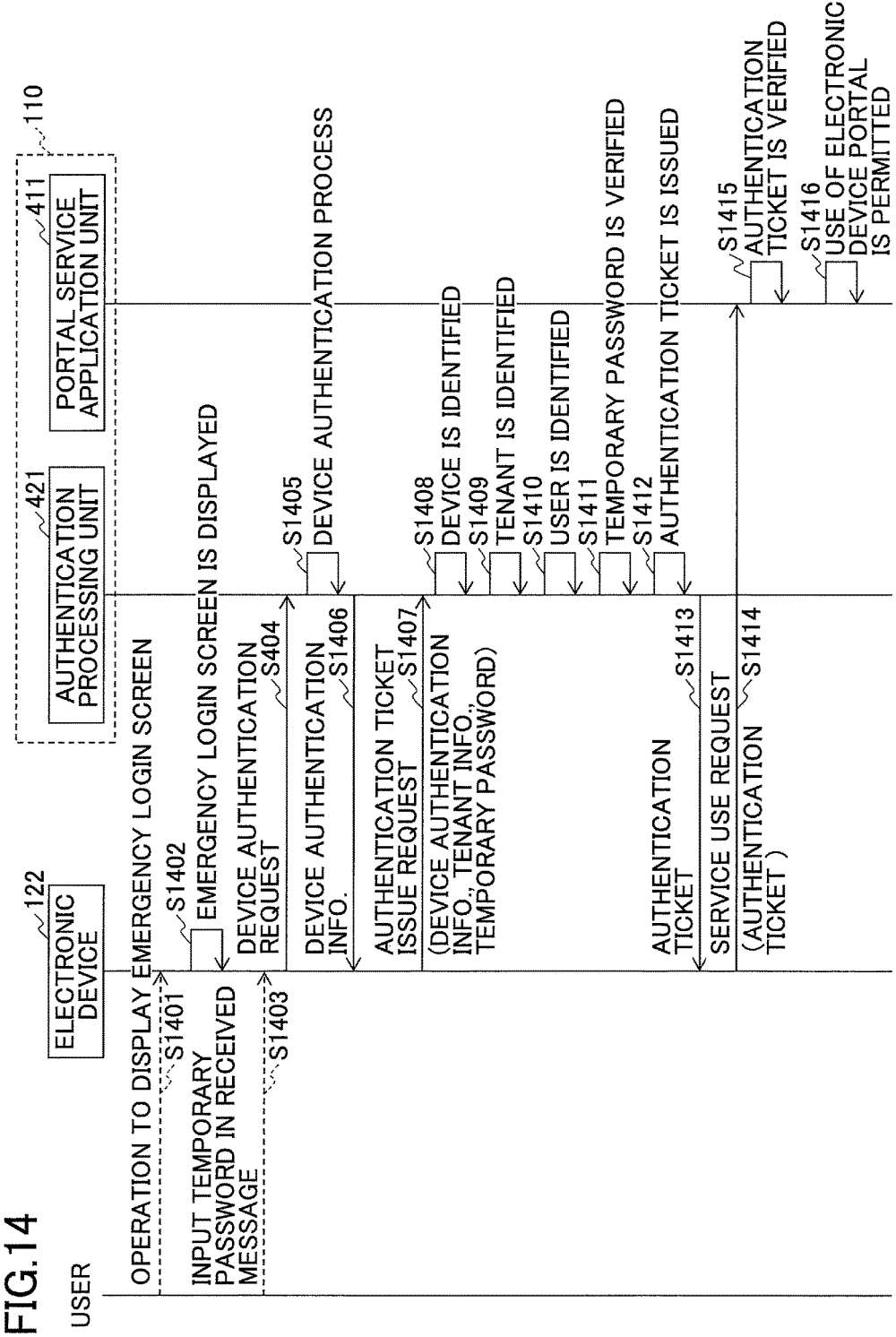

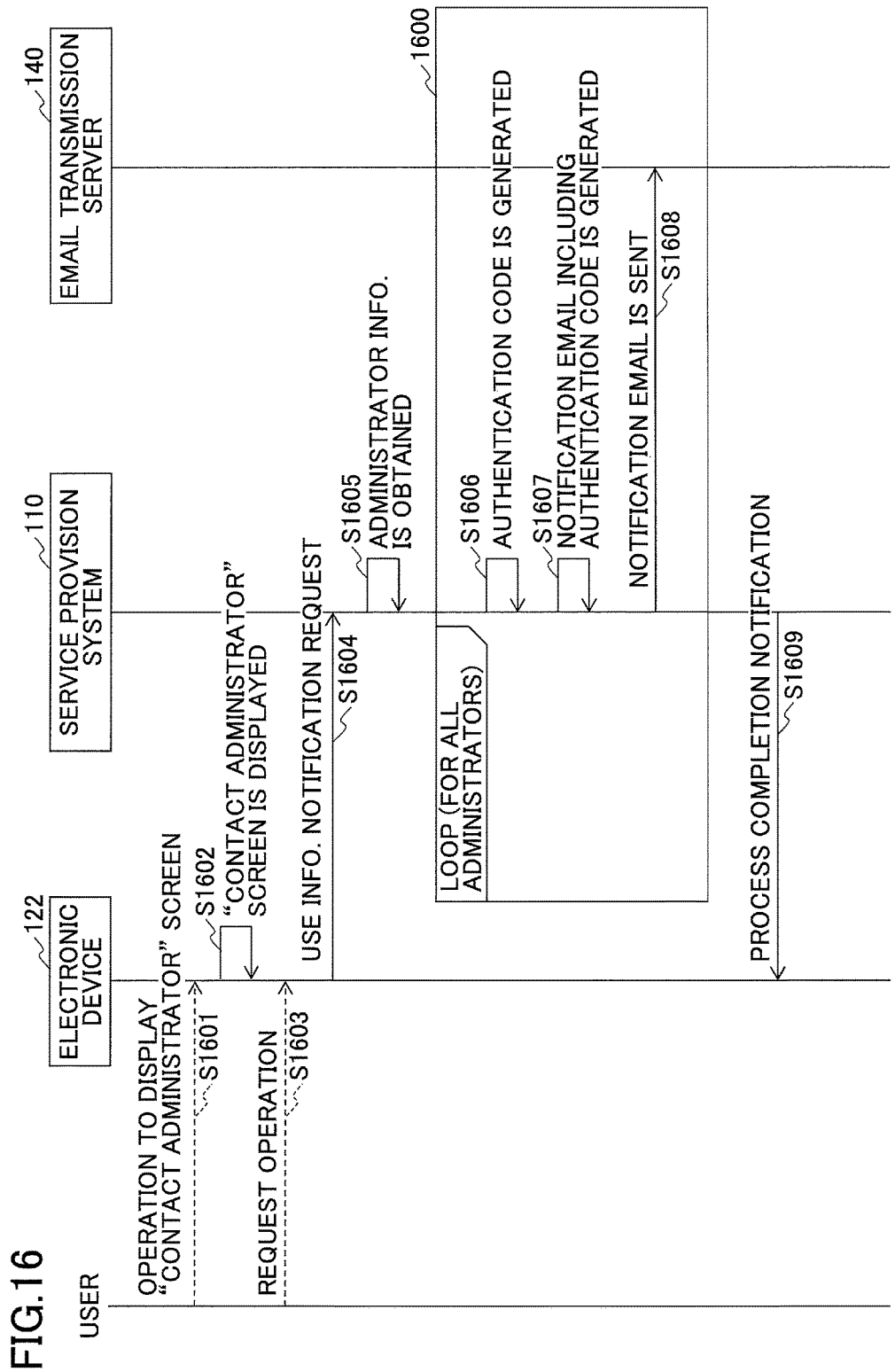

SERVICE PROVISION SYSTEM, INFORMATION PROCESSING SYSTEM, INFORMATION PROCESSING APPARATUS, AND SERVICE PROVISION METHOD

CROSS-REFERENCE TO RELATED APPLICATION

The present application is based upon and claims the benefit of priority of Japanese Patent Application No. 2015-115433, filed on Jun. 8, 2015, the contents of which are incorporated herein by reference in their entirety.

BACKGROUND OF THE INVENTION

1. Field of the Invention

The present invention relates to a service provision system, an information processing system, an information processing apparatus, and a service provision method.

2. Description of the Related Art

An authentication method (which is called "single sign-on") in which an authentication result from a predetermined authentication service system to which a user logs in with a single ID and password is trusted and a requested service is provided to the user while omitting authentication operations in connection with a plurality of predefined services is known.

For example, there is known in the art an authentication service system which sends, in response to an authentication request from a client device, a notification including generated authentication information to the client device, and receives from another authentication service system a checking request of the authenticity of the authentication information sent to the client device. See Japanese Laid-Open Patent Publication No. 2005-227891.

In the single sign-on, when the user has authentication information for logging in to the predetermined authentication service system, the user is able to use a service even if the user has no authentication information of a service provision system which provides the service.

However, in such a system, when the authentication service system stops operation, the user is unable to use the service provided from the service provision system with the authentication information from the authentication service system. In many cases, a normal user may have not stored (or not registered) the authentication information for logging in to the service provision system. In order to make use of the service in this situation, the user has to perform a difficult task, such as resetting the password.

SUMMARY OF THE INVENTION

In one aspect, the present invention provides a service provision system adapted to easily provide a predetermined service to a user even when an external authentication system, which is configured issue authentication information required for use of the predetermined service, stops operation.

In one embodiment, the present invention provides a service provision system including a processor configured to provide a predetermined service based on first authentication information issued by an external first authentication unit, the processor being configured to implement a notification unit configured to send to a user of the predetermined service a notification of third authentication information for obtaining second authentication information different from the first authentication information, an issue unit configured to issue the second authentication information in response to an issue request of the second authentication information including the third authentication information, and a second authentication unit configured to verify authenticity of a use request of the predetermined service including one of the first authentication information and the second authentication information.

The object and advantages of the invention will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF THE DRAWINGS

FIGS. 6A through 6C are diagrams showing examples of user information, tenant information, and device information of the information processing system.

FIGS. 7A and 7B are diagrams showing examples of authentication code management information and authentication ticket management information of the information processing system.

FIG. 14 is a sequence diagram for explaining a process performed by the information processing system according to the second embodiment.

FIG. 16 is a sequence diagram for explaining an administrator notification process according to the second embodiment.

DETAILED DESCRIPTION OF THE PREFERRED EMBODIMENTS

A description will be given of embodiments with reference to the accompanying drawings.

[System Configuration]

Figure 1:
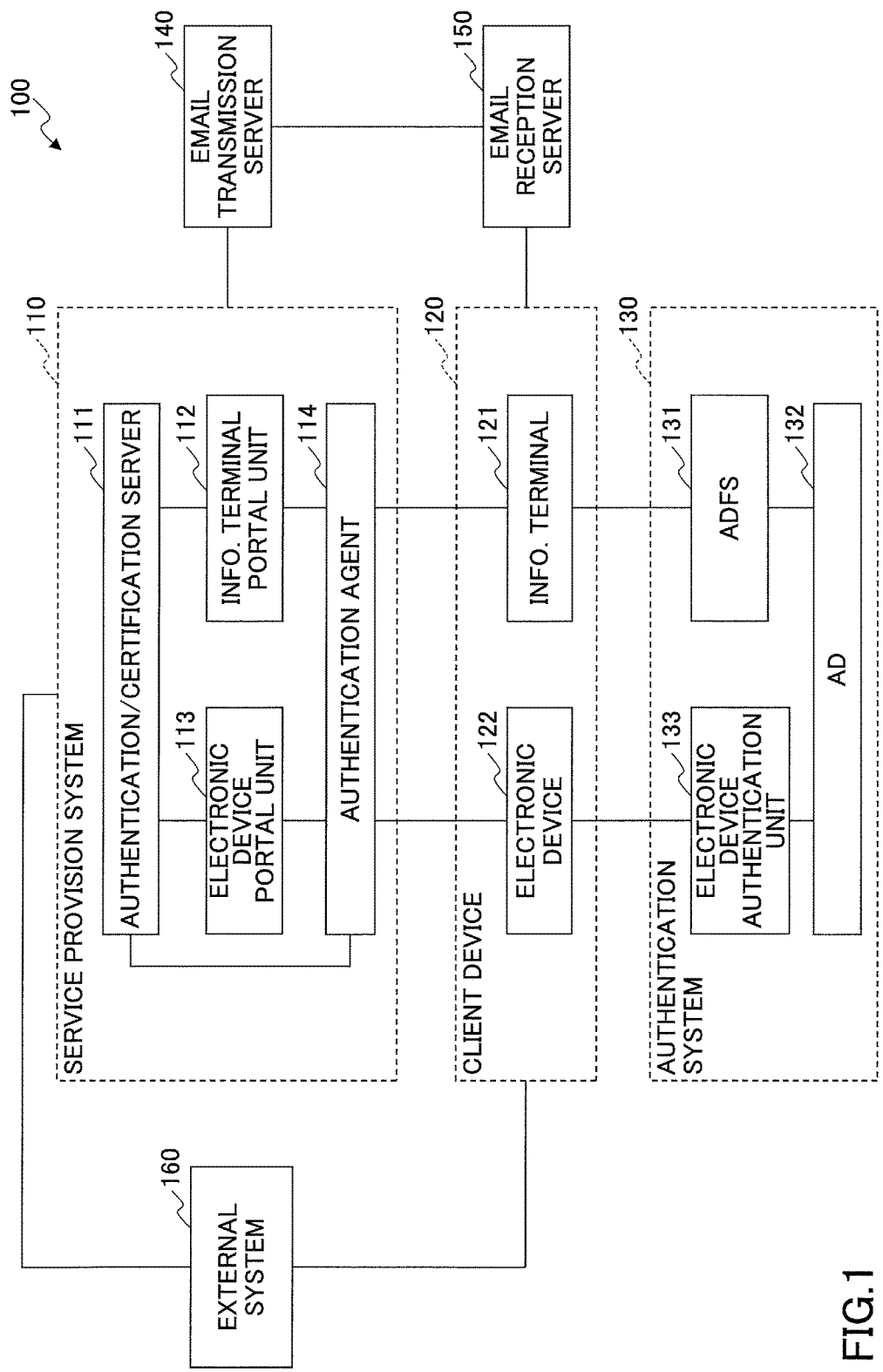
FIG. 1 is a block diagram showing a configuration of an information processing system according to one embodiment.

A configuration of an information processing system according to one embodiment will be described. FIG. 1 shows a configuration of an information processing system 100 according to one embodiment. As shown in FIG. 1, the information processing system 100 includes a service provision system 110, a client device 120, and an authentication system 130. Further, the information processing system 100 is configured to interact with an email transmission server 140, an email reception server 150, and an external system 160 to perform various processes. Note that the service provision system 110, the client device 120, the authentication system 130, the email transmission server 140, the email reception server 150, and the external system 160 are interconnected by a network, such as the Internet or a local area network (LAN).

The authentication system 130 may be an identity provider (IdP) configured to issue predetermined authentication information (an authentication ticket) to the client device 120 which is successfully authenticated. For example, the authentication system 130 may be installed in a corporate network in which the client device 120 is installed.

The service provision system 110 may be a service provider (SP) configured to provide a predetermined service to the client device 120 which has received the authentication ticket issued by the authentication system 130. For example, the service provision system 110 may be a cloud server installed outside the corporate network.

The client device 120 includes an information terminal 121 and an electronic device 122 on which a user uses a predetermined service provided from the service provision system 110. For example, the information terminal 121 may be a general-purpose information processing apparatus, such as a personal computer (PC), a tablet terminal, or a smart phone. For example, the electronic device 122 may be an image forming apparatus, such as a multi-function peripheral (MFP), a printer, a scanner or a copier, or an office device, such as an interactive whiteboard (IWB), a projector or a videoconference device, which is shared by multiple users. The client device 120 is configured to communicate with any of the service provision system 110, the authentication system 130, the email reception server 150 and the external system 160 via the network.

A predetermined confidential relationship (trust circle) between the service provision system 110 and the authentication system 130 is established. Further, the service provision system 110 and the authentication system 130 share identification information of a user (e.g., an email address or the subject of a certificate).

In the above-described information processing system 100, when the user logs in to the authentication system 130 by using the client device 120, the authentication system 130 issues an authentication ticket to the client device 120. By accessing the service provision system 110 with the authentication ticket, the user is able to omit the authentication operations and use the service provided from the service provision system 110.

Similarly, the information processing system 100 may be configured so that the user is able to omit the authentication operations and use a service provided from another service provision system (e.g., the external system 160) included in the trust circle, by means of the client device 120.

Next, the outline of a process performed by the information processing system 100 in a normal operation will be described.

For example, when the user logs in to the authentication system 130 in the information processing system 100 shown in FIG. 1 by using the information terminal 121, a login authentication process is performed with an active directory (AD) 132 based on the authentication information (the user's ID and password). If the user successfully logs in to the AD 132, an authentication ticket (or an authentication cookie) is issued to the information terminal 121 by an active directory federation service (ADFS) 131.

Note that the AD 132 may be an example of a directory service in which the user registered in the AD 132 is authenticated via the network. Further, the ADFS 131 may be an example of a federation service configured to issue to the user (who is successfully authenticated with the AD 132) an authentication ticket (or an authentication cookie) which may be used in the service provision system 110. Further, the AD 132 and the ADFS 131 constitute an example of the authentication system 130 which may be utilized by the information terminal 121. The authentication system 130 according to this embodiment may be configured to issue to the client device 120 (which has logged in to the authentication system 130) the authentication ticket (the authentication cookie) which may be utilized in the service provision system 110.

Subsequently, the user who has logged in to the authentication system 130 requests access of an information terminal portal site (which will be called a portal) which is provided from the service provision system 110, by using the information terminal 121. At this time, the information terminal 121 transmits an access request including the authentication ticket issued by the authentication system 130 to the service provision system 110.

Upon receipt of the access request from the information terminal 121, an authentication agent 114 of the service provision system 110 permits connection of the information terminal 121 with the information terminal portal when the received access request includes the authentication ticket issued by the authentication system 130. On the other hand, when the received access request does not include the authentication ticket issued by the authentication system 130, the authentication agent 114 displays on the information terminal 121, for example, an input screen for prompting the user to enter an ID and password for logging in to the service provision system 110.

Note that the authentication agent 114 may be configured to check the authenticity of the authentication ticket included in the access request received from the information terminal 121 by sending a checking request to an authentication/certification server 111. For example, the authentication ticket may include information indicating an issuer of the authentication ticket, a digital signature, and identification information of the user.

In the authentication/certification server 111, a certificate (public key certificate) of the authentication system 130 and the identification information of the user which is shared with the authentication system 130 are stored beforehand.

Hence, the authentication/certification server 111 is configured to digitally verify the authenticity of the authentication ticket by using the certificate of the authentication system 130, and determine whether the identification information of the user included in the authentication ticket is consistent with the registered identification information of the user.

The authentication/certification server 111 successfully authenticates the user when the information included in the access request is consistent with the digital signature of the certificate of the authentication system 130 and the registered identification information of the user.

When the authentication system 130 stops operation in the above-described information processing system 100 for a certain reason, the client device 120 is unable to receive an authentication ticket issued by the authentication system 130.

In this case, the service provision system 110 according to this embodiment is configured to transmit, in response to an administrator's operation, an email including an authentication code for issuing a temporary authentication ticket to the user of the service provision system 110 via the email transmission server 140.

The user of the information terminal 121 clicks a URL (Uniform Resource Locator) for temporary use which is included in the email received from the service provision system 110 via the email reception server 150. Note that the URL for temporary use may include the authentication code for issuing the temporary authentication ticket. The service provision system 110 verifies the authentication code included in the access request to the URL for temporary use. When the authentication code is verified as being the right authentication code, the service provision system 110 issues the temporary authentication ticket for using the service provision system 110 to the information terminal 121.

By using the issued temporary authentication ticket, the information terminal 121 is able to access the information terminal portal provided from the service provision system 110.

Although the case where the client device 120 is implemented by the information terminal 121 has been described above, the process in a case where the client device 120 is implemented by the electronic device 122 is similar to the above-described process.

For example, the user may log in to the authentication system 130 in the information processing system 100 shown in FIG. 1 with an IC card by using the electronic device 122. In response to this, an electronic device authentication device 133 performs a login authentication of the user by determining whether identification information of the user of the IC card is included in the identification information of the users registered and stored in the AD 132. If the user successfully logs in to the AD 132, an authentication ticket (or an authentication cookie) is issued to the electronic device 122 by the electronic device authentication device 133.

When the authentication system 130 stops operation in the information processing system 100 for a certain reason, the electronic device 122 may receive an email including an authentication code for issuing a temporary authentication ticket from the service provision system 110. In the received email, a string of characters (password) for receiving a temporary authentication ticket from the electronic device 122 in addition to the URL for temporary use are included. The user is able to receive the temporary authentication ticket from the service provision system 110 by entering the password into the electronic device 122.

Therefore, in the service provision system 110 according to this embodiment, even when the external authentication system 130 configured to issue the authentication information required for use of a predetermined service stops operation, the predetermined service may be easily provided to the user.

It is to be understood that the system configuration of FIG. 1 is exemplary and explanatory and is not restrictive of the invention as claimed. For example, the authentication system configured to issue the authentication ticket required for using the service provided from the service provision system 110 may be an authentication system which is provided from the external system 160.

Further, the information terminal portal and the electronic device portal are examples of the predetermined service provided from the service provision system 110. The predetermined service provided from the service provision system 110 may include various services, such as a print service, a scan service, a storage service, a video-conference service, etc.

Further, the email including the authentication code for issuing the temporary authentication ticket, which is sent to the user by the service provision system 110, may be a message other than an email sent by a messaging service or a social network service (SNS).

Next, a hardware configuration of the service provision system 110, the client device 120, and the authentication system 130 of the information processing system 100 will be described.

Each of the service provision system 110 and the authentication system 130 according to this embodiment may have a hardware configuration of an information processing apparatus such as a general-purpose computer, or a hardware configuration of a combination of information processing apparatuses. Further, the information terminal 121 according to this embodiment may have a hardware configuration of a general-purpose computer. In the following, the hardware configuration of a general-purpose computer will be described.

Figure 2:
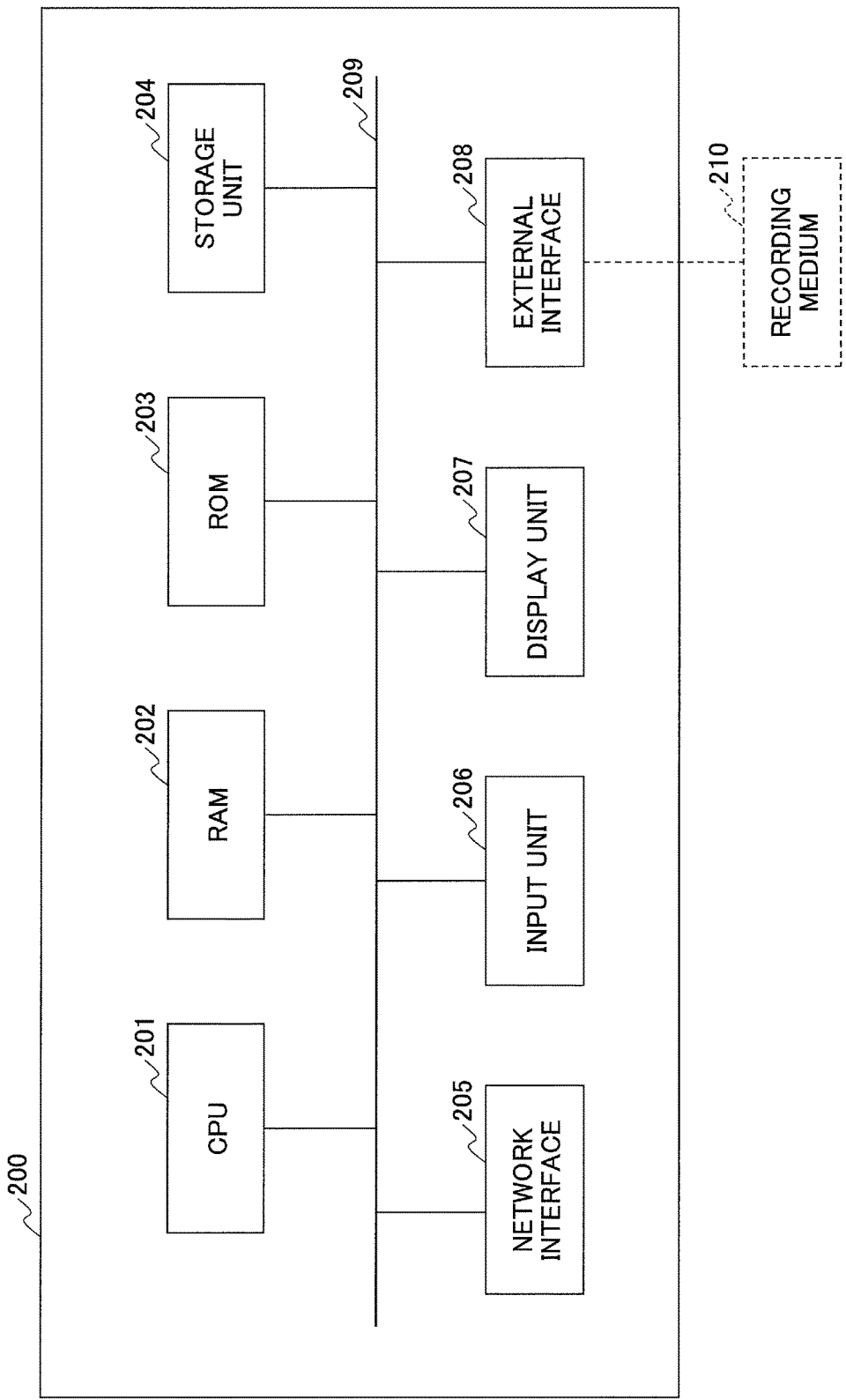
FIG. 2 is a block diagram showing a hardware configuration of a computer according to one embodiment.

FIG. 2 shows a hardware configuration of a computer 200 according to one embodiment. As shown in FIG. 2, the computer 200 includes a central processing unit (CPU) 201, a random access memory (RAM) 202, a read-only memory (ROM) 203, a storage unit 204, a network interface 205, an input unit 206, a display unit 207, and an external interface 208, which are interconnected by a bus 209.

The CPU 201 may be a processor configured to implement functions of the computer 200 by reading programs and data from the ROM 203 or the storage unit 204 to the RAM 202 and executing processes in accordance with the programs. The RAM 202 may be a volatile memory utilized as a work area of the CPU 201. The ROM 203 may be a nonvolatile memory storing programs and data even when the computer is powered off. The ROM 203 may be constituted by a flash ROM. The storage unit 204 may be a storage device, such as a hard disk drive (HDD) or a solid state drive (SSD), which is configured to store an operating system (OS), application programs, and various data.

The network interface 205 may be a communication interface configured to connect the computer 200 with the network and perform data communications with another computer or an electronic device. The network interface 205 may be a wired or wireless LAN interface.

The input unit 206 may be an input device such as a keyboard, a mouse, or a touch panel, which is configured to receive an input for operating the computer 200. The display unit 207 may be a display device such as a liquid crystal display (LCD), which is configured to display the processing result of the computer 200. Note that the input unit 206 or the display unit 207 may be provided outside the computer 200. Alternatively, the input unit 206 and the display unit 207 may be integrated into a display and input device such as a touch-panel display.

The external interface 208 may be an interface configured to connect an external device with the computer 200. The external device may include a computer-readable recording medium such as a universal serial bus (USB) memory, a memory card or an optical disk, and any of various electronic devices.

The bus 209 interconnects the above-described elements of the computer 200 to transmit address signals, data signals, and various control signals.

Next, a hardware configuration of an image forming apparatus 103 as an example of the electronic device 122 according to this embodiment will be described.

Figure 3:
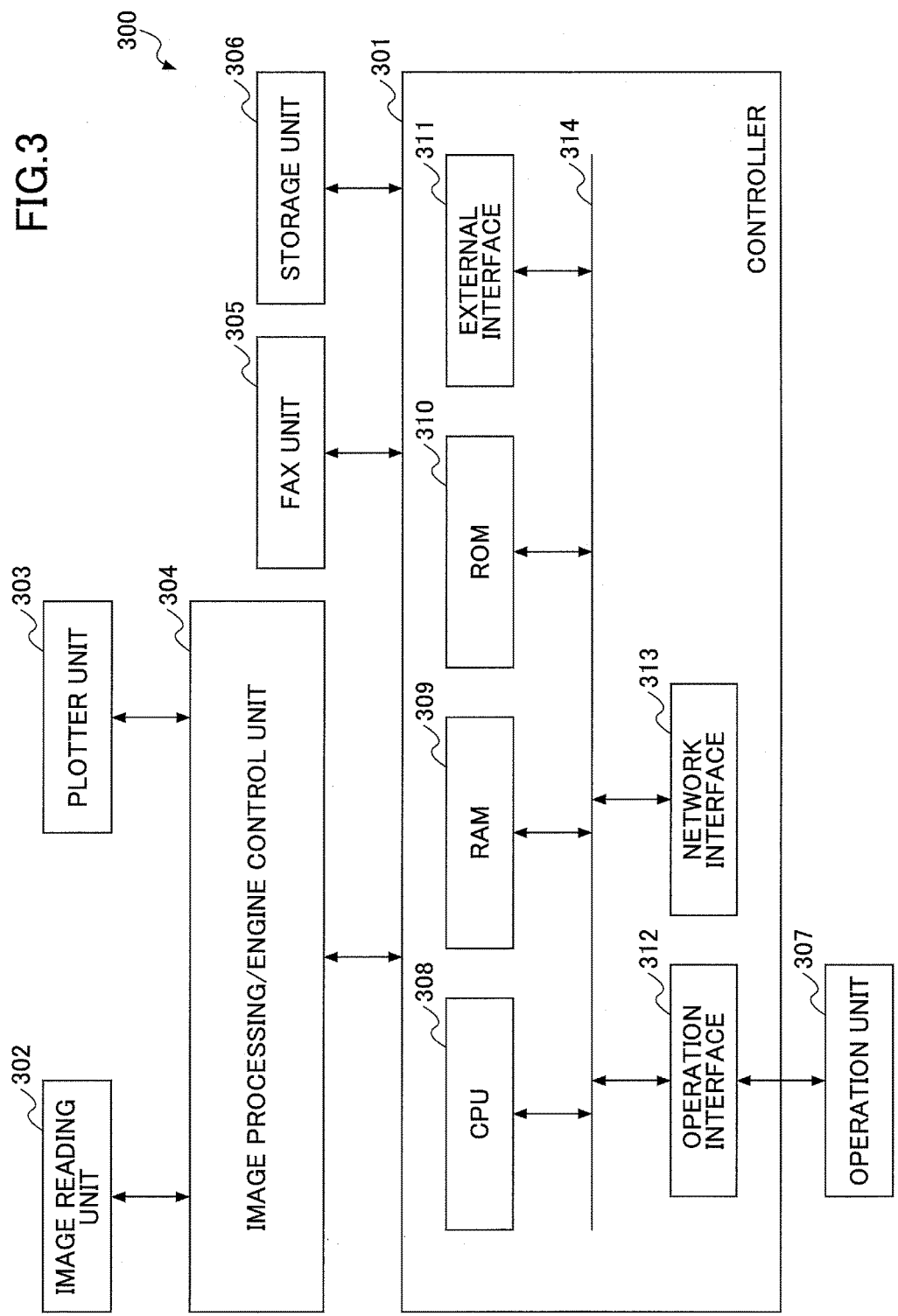
FIG. 3 is a block diagram showing a hardware configuration of an image forming apparatus according to one embodiment.

FIG. 3 shows a hardware configuration of the image forming apparatus 300 according to one embodiment. As shown in FIG. 3, the image forming apparatus 300 includes a controller 301, an image reading unit 302, a plotter unit 303, an image processing/engine control unit 304, a fax unit 305, a storage unit 306, and an operation unit 307.

The controller 301 may have a hardware configuration of a general-purpose computer. As shown in FIG. 3, the controller 301 includes a CPU 308, a RAM 309, a ROM 310, an external interface 311, an operation interface 312, and a network interface 313, which are interconnected by a bus 314.

The CPU 308 may be a processor configured to implement functions of the image forming apparatus 300 by reading programs and data from the ROM 310 or the storage unit 306 to the RAM 309 and executing processes in accordance with the programs. The RAM 309 may be a volatile memory utilized as a work area of the CPU 308. The ROM 310 may be a nonvolatile memory storing programs and data even when the controller is powered off. The ROM 310 may be constituted by a flash ROM.

The external interface 311 may be an interface configured to connect an external device with the controller 301. The external device may include a computer-readable recording medium such as a USB memory, a memory card or an optical disk, an information terminal, and an electronic device. The operation interface 312 may be an interface configured to connect the operation unit 307 with the controller 301. The network interface 313 may be a communication interface configured to connect the image forming apparatus 300 with the network and perform data communications with an apparatus connected to the network.

The image reading unit 302 may be a scanner device configured to read an image from a document according to the control of the image processing/engine control unit 304. The plotter unit 303 may be a plotter device configured to output an image onto a sheet such as paper according to the control of the image processing/engine control unit 304. The image processing/engine control unit 304 may be a control unit configured to control the image reading unit 302 and the plotter unit 303 and perform image processing.

The fax unit 305 may include a hardware engine configured to perform fax transmission and reception, and a control unit configured to control the hardware engine. The storage unit 306 may be a storage device such as a HDD or an SSD, which is configured to store including an OS, application programs, image data, and various data.

The operation unit 307 may include a hardware unit (display unit) configured to display information to a user, and a hardware unit (input unit) configured to receive an input operation from the user.

Note that the electronic device 122 according to this embodiment may have a hardware configuration of a general-purpose computer similar to the image forming apparatus 103.

Next, a functional configuration of the service provision system 110 will be described.

Figure 4:
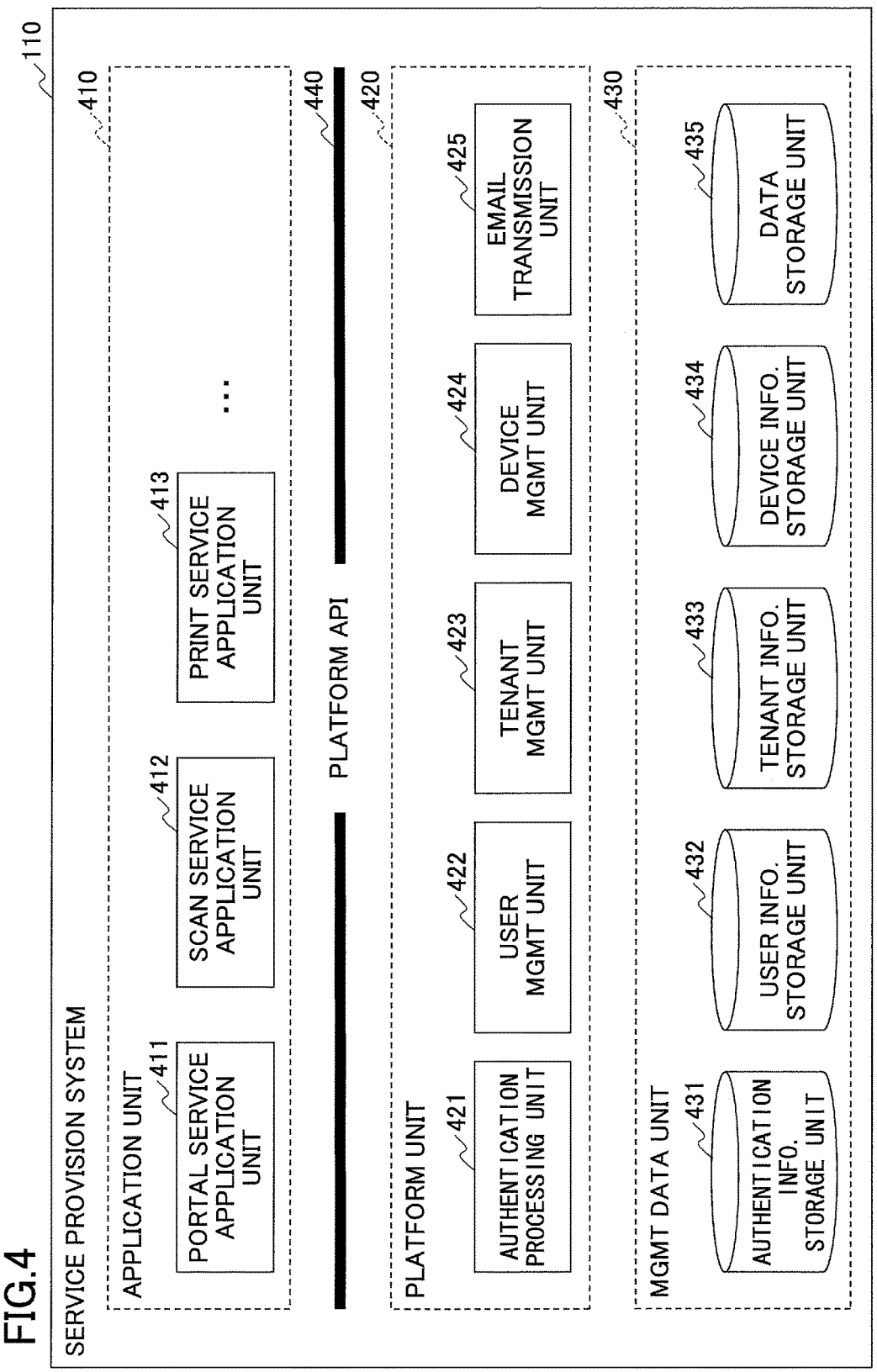
FIG. 4 is a block diagram showing a functional configuration of a service provision system according to one embodiment.

FIG. 4 shows a functional configuration of the service provision system 110 according to one embodiment. As shown in FIG. 4, the service provision system 110 includes an application unit 410, a platform unit 420, a management data unit 430, and a platform API (application programming interface) 440. These units represent functions and units implemented by any of the elements and devices of the computer 200 shown in FIG. 2, which are activated by instructions from the CPU 201 based on a predetermined program stored in the ROM 203.

The application unit 410 may include a portal service application unit 411, a scan service application unit 412, and a print service application unit 413. The portal service application unit 411 may be an application program configured to provide portal services, including an information terminal portal service and an electronic device portal service. The scan service application unit 412 may be an application program configured to provide scan services. The print service application unit 413 may be an application program configured to provide print services.

The platform API 440 may be an interface configured to enable the application unit 410 to utilize the platform unit 420. The platform API 440 may be a pre-defined interface configured to enable the platform unit 420 to receive a request from the application unit 410. The platform API 420 may be constructed by functions and classes. Note that when the service provision system 110 is constructed by two or more information processing apparatuses and the functions of the service provision system 110 are distributed to the information processing apparatuses, a web API which is available via the network may be utilized as the platform API 440.

The platform unit 420 may include an authentication processing unit 421, a user management unit 422, a tenant management unit 423, a device management unit 424, and an email transmission unit 425.

The authentication processing unit 421 is configured to authenticate an authentication ticket included in a use request or a login request from the client device 120. Note that the authentication processing unit 421 corresponds to the authentication/certification server 111 of the service provision system 110 shown in FIG. 1.

The user management unit 422 is configured to manage user information. The tenant management unit 423 is configured to manage tenant information. The device management unit 424 is configured to manage device information. The email transmission unit 425 is configured to perform an email transmission process.

The management data unit 430 may include an authentication information storage unit 431, a user information storage unit 432, a tenant information storage unit 433, a device information storage unit 434, and a data storage unit 435.

The authentication information storage unit 431 is configured to store authentication information which will be described later. The user information storage unit 432 is configured to store user information which will be described later. The tenant information storage unit 433 is configured to store tenant information which will be described later. The device information storage unit 434 is configured to store device information which will be described later. The data storage 435 is configured to store other data.

The platform unit 420 includes functions common to two or more service applications included in the application unit 410, or basic functions utilized by the service applications. The functions of the units included in the platform unit 420 are published to the application unit 410 by the platform API 440. In other words, the functions of the units included in the platform unit 420 in the range published by the platform API 440 may be utilized by the application unit 410.

Note that the configuration of the application unit 410, the platform API 440, the platform unit 420, and the management data unit 430 of the service provision system 110 shown in FIG. 4 is exemplary and explanatory, and is not restrictive of the invention as claimed. For example, the service provision system 110 does not necessarily require the hierarchical configuration as shown in FIG. 4.

Next, the functional configuration of the authentication processing unit 421 and the portal service application unit 411 will be described in more detail.

Figure 5:
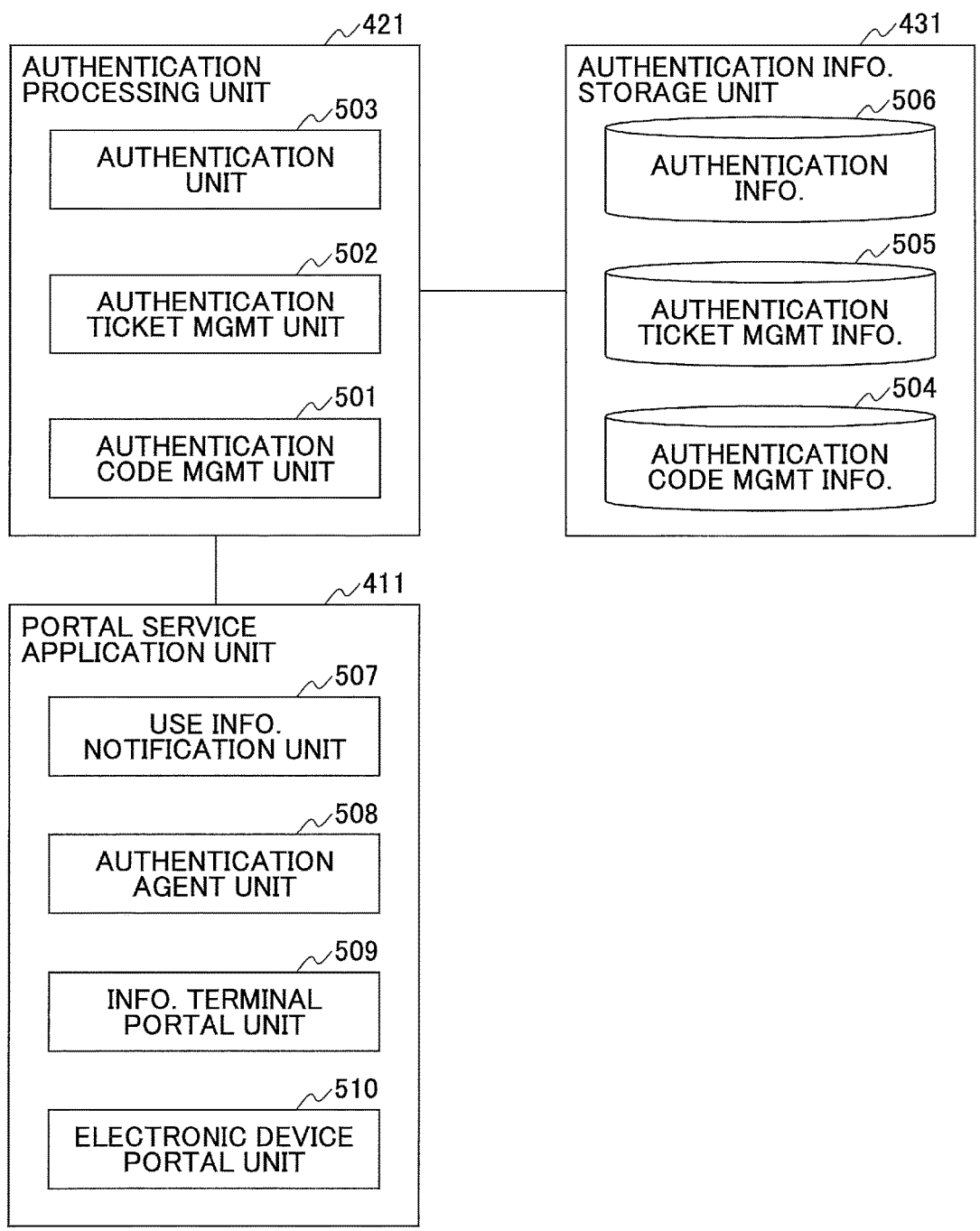
FIG. 5 is a block diagram showing a functional configuration of an authentication processing unit and a portal service application unit.

FIG. 5 shows a functional configuration of the authentication processing unit 421 and the portal service application unit 411 according to one embodiment.

As shown in FIG. 5, the authentication processing unit 421 may include an authentication code management unit 501, an authentication ticket management unit 502, and an authentication unit 503.

As previously described with reference to FIG. 1, when the external authentication system (first authentication unit) 130 stops operation in the information processing system 100, the client device 120 is unable to receive an authentication ticket (first authentication information) issued by the authentication system 130. In this case, the service provision system 110 according to this embodiment is configured to transmit, in response to an administrator's operation, an email including an authentication code (third authentication information) for issuing a temporary authentication ticket (second authentication information) to the user of the service provision system 110.

The authentication code management unit 501 is configured to generate an authentication code for issuing a temporary authentication ticket (a second authentication ticket) to the user of the service provision system 110, in response to an input operation by the administrator of the service provision system 110. Further, the authentication code management unit 501 is configured to store and manage the generated authentication code in the authentication information storage unit 431 as authentication code management information 504. The authentication code management information 504 will be described later.

The authentication ticket management unit (an issue unit) 502 is configured to issue the second authentication ticket in response to an issue request of the second authentication ticket including the authentication code generated by the authentication code management unit 501. Further, the authentication ticket management unit 502 is configured to store and manage the information of the issued second authentication ticket in the authentication information storage unit 431 as authentication ticket management information 505. The authentication ticket management information 505 will be described later.

It is preferable that the authentication ticket management unit 502 is configured to issue a second authentication ticket (authentication cookie) in a format identical to a format of the authentication ticket (first authentication ticket) issued by the authentication system 130. With this second authentication ticket, the user of the service provision system 110 is able to use the service provided from the service provision system 110 in a manner similar to that in the case where the first authentication ticket issued by the authentication system 130 is received.

The authentication unit 503 is configured to perform an authentication process based on authentication information 506 and the authentication code management information 504 stored in the authentication information storage unit 431.

When a use request of a predetermined service including an authentication ticket is received from the client device 120, an authentication agent unit 508 of the portal service application unit 411 is configured to send an authentication request in connection with the received use request to the authentication unit 503. The authentication unit 503 configured to verify authenticity of the received use request when the received use request includes the first authentication ticket issued by the authentication system 130 or the second authentication ticket issued by the authentication ticket management unit 502.

Note that the authentication information 506 may include various information items in connection with the authentication of the service provision system 110, including the certificate of the authentication system 130, the certificate of the service provision system 110, and the identification information of the user which is shared with the authentication system 130.

As shown in FIG. 5, the portal service application unit 411 may include a use information notification unit 507, an authentication agent unit 508, an information terminal portal unit 509, and an electronic device portal unit 510.

The use information notification unit (notification unit) 507 is configured to send to a user a notification of an authentication code for obtaining the second authentication ticket different from the first authentication ticket issued by the authentication system 130. For example, the use information notification unit 507 may send an email including the authentication code for obtaining the second authentication ticket to an email address of the user.

The user who receives the email sent by the use information notification unit 507 may be all users of a tenant, a user who plays a specific role (an administrator), or a user who utilizes a specific service (an electronic device portal). Alternatively, the use information notification unit 507 may be configured to provide the information terminal 121 with a selection screen for selecting the users who receive the email from the use information notification unit 507, and configured to send the email to the selected users.

The authentication agent unit 508 is configured to send an authentication request in connection with an authentication ticket to the authentication unit 503 when the authentication ticket is included in the use request of the service received from the client device 120. Further, the authentication agent unit 508 is configured to permit the use of the information terminal portal or the electronic device portal by the client device 120 when the authenticity of the authentication ticket is verified by the authentication unit 503.

On the other hand, when the authentication ticket is not included in the use request of the service received from the client device 120, or when the authenticity of the authentication ticket is not verified by the authentication unit 503, the authentication agent unit 508 is configured to display an authentication screen on the client device 120. Note that the authentication agent unit 508 corresponds to the authentication agent 114 of the service provision system 110 shown in FIG. 1.

The information terminal portal unit 509 may be configured to provide the portal for the information terminal 121 (one of the predetermined services provided from the service provision system 110). In this embodiment, a method of obtaining the second authentication ticket when the client device 120 is implemented by the information terminal 121 is different from that when the client device 120 is implemented by the electronic device 122, which will be described later. Hence, the service provision system 110 according to this embodiment is configured to include both the information terminal portal unit 509 and the electronic device portal unit 510. Note that the information terminal portal unit 509 corresponds to the information terminal portal unit 112 of the information processing system 110 shown in FIG. 1.

The electronic device portal unit 510 is configured to provide the portal for the electronic device 122 (another of the predetermined services provided from the service provision system 110). Note that the electronic device portal unit 510 corresponds to the electronic device portal unit 113 of the information processing system 110 shown in FIG. 1.

In the following, examples of the user information, the tenant information, and the device information stored in the service provision system 110 will be described.

[User Information]

FIG. 6A shows an example of user information 601. In the example of FIG. 6A, the user information 601 includes data items of tenant ID, user ID, password, role, email address, last name, first name, and language. The user management unit 422 is configured to manage the user information 601 on a tenant ID-by-tenant ID basis.

The tenant ID may be identification information which identifies a contract unit (tenant) which is set in the service provision system 110. The contract unit may be a unit of a company or an organization, or may be a unit of a group, a base location or a department in a company. In the following, as an example, a case where different tenant IDs are assigned to groups in a company is explained.

A pair of user ID and password may be identification information which identifies a user which is set in the service provision system 110. The user ID may be replaced with a user name. The password is not indispensable for the identification information of a user. Further, an electronic medium (e.g., an IC card) which the user carries may be used instead of the user ID. A pair of user ID and password associated with a tenant ID is unique. However, two or more pairs of user ID and password may overlap if the pairs are associated with different tenant IDs.

The role may be identification information that identifies a role of a user (e.g., an administrator, a normal user, a developer, etc.). The email address may be an email address of a user. Note that the email address may be replaced with an account of a messaging service or a social networking site (SNS) by which the notification of the authentication code including a predetermined message is sent to a user. The last name and the first name may be a last name and a first name of a user. The language may be a language used by a user.

[Tenant Information]

FIG. 6B shows an example of tenant information 602. In the example of FIG. 6B, the tenant information 602 includes data items of tenant ID, tenant name, country name, and authentication system.

The tenant ID may be identification information which identifies a tenant, and it corresponds to the tenant ID in the user information 601 shown in FIG. 6A. The tenant name may be a name of a tenant. The country name may be a name of a country of a base location of a tenant.

The authentication system may be information indicating the authentication system (IdP) having issued an ID which is used by a user of each tenant when logging in to the service provision system 110. In the example of FIG. 6B, "AD" indicates that the related user logs in to the service provision system 110 by using an ID of the AD 132 installed in the corporate network shown in FIG. 1. "External" indicates that the related user logs in to the service provision system 110 by using an ID of a public cloud server, such as the external system 160, installed outside the corporate network shown in FIG. 1. "NSP (network service provider)" indicates that the related user logs in to the service provision system 110 using ID of the service provision system 110.

[Device Information]

FIG. 6C shows an example of device information 603. In the example of FIG. 6C, the device information 603 includes data items of tenant ID, device authentication information, and function information.

The tenant ID may be identification information which identifies a tenant, and it corresponds to the tenant ID in the user information 601 of FIG. 6A and the tenant information 602 of FIG. 6B. The device authentication information may be information utilized for authentication of the electronic device 122. For example, this information may be utilized to determine whether the electronic device 122 having accessed the service provision system 110 is a registered electronic device. The function information may be information indicating functions of each electronic device.

[Authorization Code Management Information]

FIG. 7A shows an example of authentication code management information 504 which is managed by the authentication code management unit 501. In the example of FIG. 7A, the authentication code management information 504 includes data items of internal ID, tenant ID, user ID, temporary code, temporary password, start date and time, and end date and time.

The internal ID may be identification information for internal management used for distinguishing two or more records. The tenant ID may be identification information which identifies a tenant, and it corresponds to the tenant ID in the user information 601, the tenant information 602, and the device information 603. The user ID may be identification information which identifies a user, and it corresponds to the user ID in the user information 601.

The temporary code may be an authentication code (third authentication information) for the information terminal 121 associated with the user ID, and it is generated by the authentication code management unit 501. The temporary code may be unique identification information used by the information terminal 121 when requesting issue of a second authentication ticket of the service provision system 110.

The temporary password may be an authentication code (third identification information) for the electronic device 122 associated with the user ID, and it is generated by the authentication code management unit 501. The temporary password may be unique identification information used by the electronic device 122 when requesting issue of a second authentication ticket of the service provision system 110. The temporary password may be a strung of characters corresponding to the temporary code and having a length smaller than a length of the temporary code. For example, the temporary password may be unique identification information within the tenant.

The start date and time may be time information indicating the time from which the authentication code (temporary code, temporary password) becomes available. The end date and time may be time information indicating the time after which the authentication code (temporary code, temporary password) is no longer available.

In this embodiment, a period for which the authentication code generated by the authentication code management unit 501 is available is restricted. However, this is exemplary. Alternatively, the period for which the authentication code generated by the authentication code management unit 501 is available may be unrestricted.

[Authentication Ticket Management Information]

FIG. 7B shows an example of authentication ticket management information 505 which is managed by the authentication ticket management unit 502. In the example of FIG. 7B, the authentication ticket management information 505 includes data items of tenant ID, user ID, authentication ticket ID, internal ID, and expiry date.

The tenant ID may be identification information which identifies a tenant, and it corresponds to the tenant ID in the user information 601, the tenant information 602, the device information 603, and the authentication code management information 504. The user ID may be identification information which identifies a user, and it corresponds to the user ID in the user information 601 and the authentication code management information 504.

The authentication ticket ID may be identification information which identifies a second authentication ticket issued by the authentication ticket management unit 502. The authentication ticket ID may be included in the second authentication ticket.

The internal ID may be identification information for internal management for distinguishing two or more records, and it corresponds to the internal ID in the authentication code management information 504. The expiry date may be information which indicates an expiry date of the second authentication ticket issued by the authentication ticket management unit 502. The expiry date corresponds to the end date and time in the authentication code management information 504.

It is preferable that the authentication code management unit 501 is configured to delete the management information of the authentication code which has passed the end date and time among the authentication codes managed by the authentication code management information 504, and to send a notification of the internal ID of the deleted authentication code to the authentication ticket management unit 502.

Thereby, the authentication ticket management unit 502 is able to delete the management information of the second authentication ticket corresponding to the authentication code deleted by the authentication code management unit 501.

[Outline of Processes]

Figure 8:
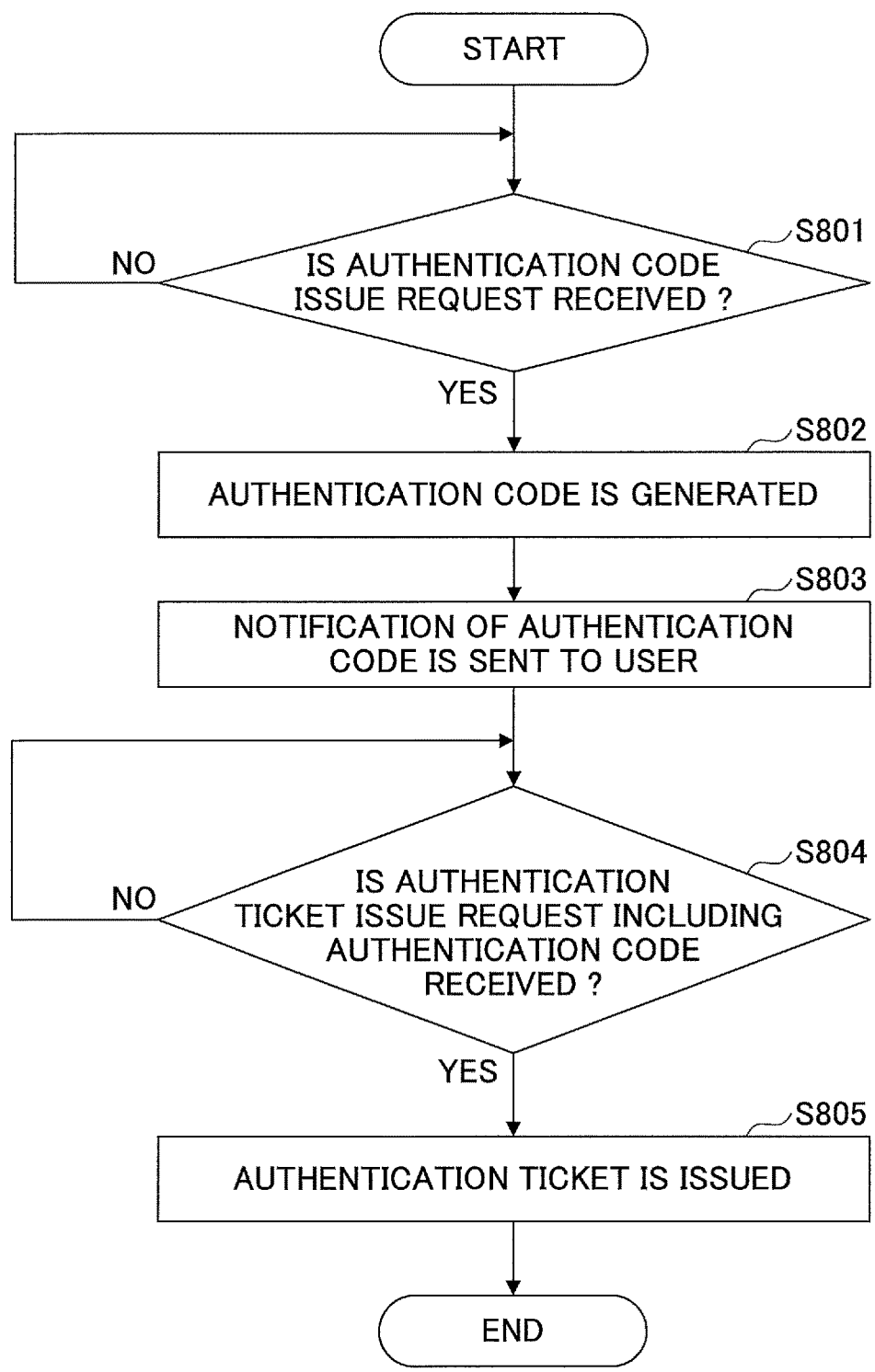
FIG. 8 is a flowchart for explaining an authentication ticket issue process according to one embodiment.

Next, FIG. 8 is a flowchart for explaining an authentication ticket issue process according to one embodiment. In the following, a description will be given of the outline of processes performed by the service provision system 110 which are common to the first through third embodiments described later.

As shown in FIG. 8, if an authentication code issue request is received from an administrator in step S801, the service provision system 110 starts performing the process of steps S802 to S805.

In step S802, the authentication code management unit 501 of the service provision system 110 generates an authentication code for obtaining a second authentication ticket in response to the authentication code issue request, and stores the generated authentication code in the authentication code management information 504.

It is preferable that the authentication code management unit 501 is configured to generate a temporary code for the information terminal 121 and a temporary password for the electronic device 122, shown in FIG. 7A, as the authentication code for obtaining the second authentication ticket.

In step S803, the use information notification unit 507 of the service provision system 110 sends to the user a notification of the authentication code for obtaining the second authentication ticket, generated by the authentication code management unit 501.

It is preferable that the use information notification unit 507 is configured to cause the email transmission unit 425 to send a notification message including the temporary code for the information terminal 121 and the temporary password for the electronic device 122, both generated by the authentication code management unit 501, to an email address of the user. An example of the notification message sent to the user at this time is shown in FIG. 9.

Figure 9:
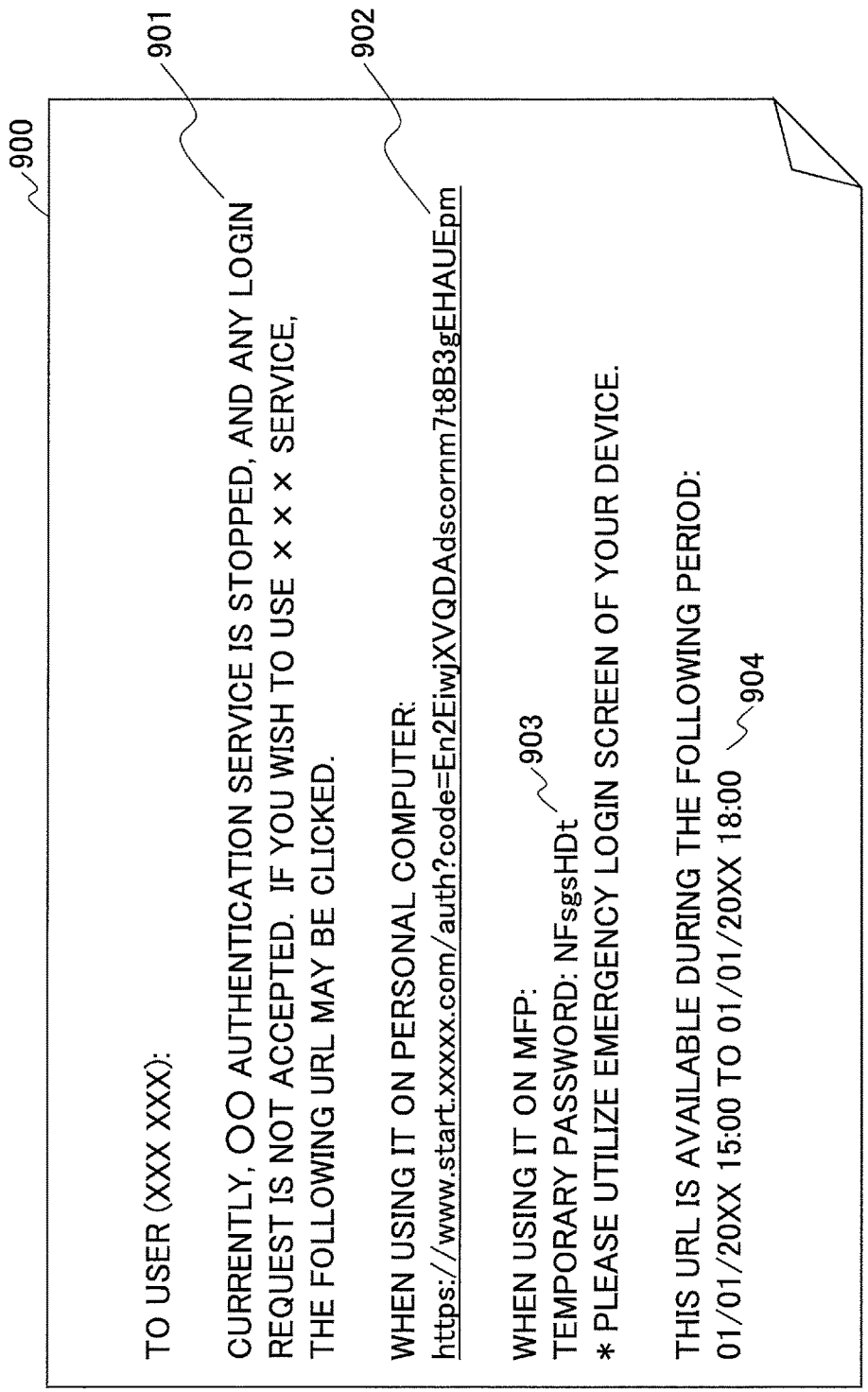
FIG. 9 is a diagram showing an example of a notification message including an authentication code.

FIG. 9 shows an example of a notification message 901 including an authentication code. As shown in FIG. 9, the notification message 900 sent to the user may include a message 901 indicating that the authentication service is stopped, a uniform resource locator (URL) 902 including a temporary code for the information terminal 121, a temporary password 903 for the electronic device 122, and an expiry date information 904.

It is preferable that the message 901 indicating that the authentication service is stopped includes information for identifying the stopped authentication service. Note that regarding the stopped authentication service, it may be specified based on the authentication system in the tenant information 602 of FIG. 6B that the external system 160 is stopped or that the AD 132 in the corporate network is stopped.

It is preferable that the URL 902 including the temporary code for the information terminal 121 is, when selected by the information terminal 121, connected to a web page for issuing a second authentication ticket of the service provision system 110. Further, at this time, the temporary code included in the URL 902 is transmitted to the service provision system 110.

It is preferable that the temporary password 903 for the electronic device 122 is represented by a string of characters having a length smaller than a length of the temporary code for the information terminal 121, and the user may easily input the temporary password 903 into an emergency login screen of the electronic device 122 which will be described later.

Referring back to FIG. 8, when an issue request of the second authentication ticket including the authentication code (the temporary code or the temporary password) in the notification sent by the use information notification unit 507 is received from the client device 120 in step S804, the authentication ticket management unit 502 shifts the process to step S805.

In step S805, the authentication ticket management unit 502 issues the second authentication ticket to the client device 120 which has transmitted the issue request of the second authentication ticket, and stores the information of the second issued authentication ticket in the authentication ticket management information 505.

By the above-described process, the user of the client device 120 is able to easily obtain the second authentication ticket based on the message 900 received from the service provision system 110 even when the authentication system 130 stops operation.

Figure 10:
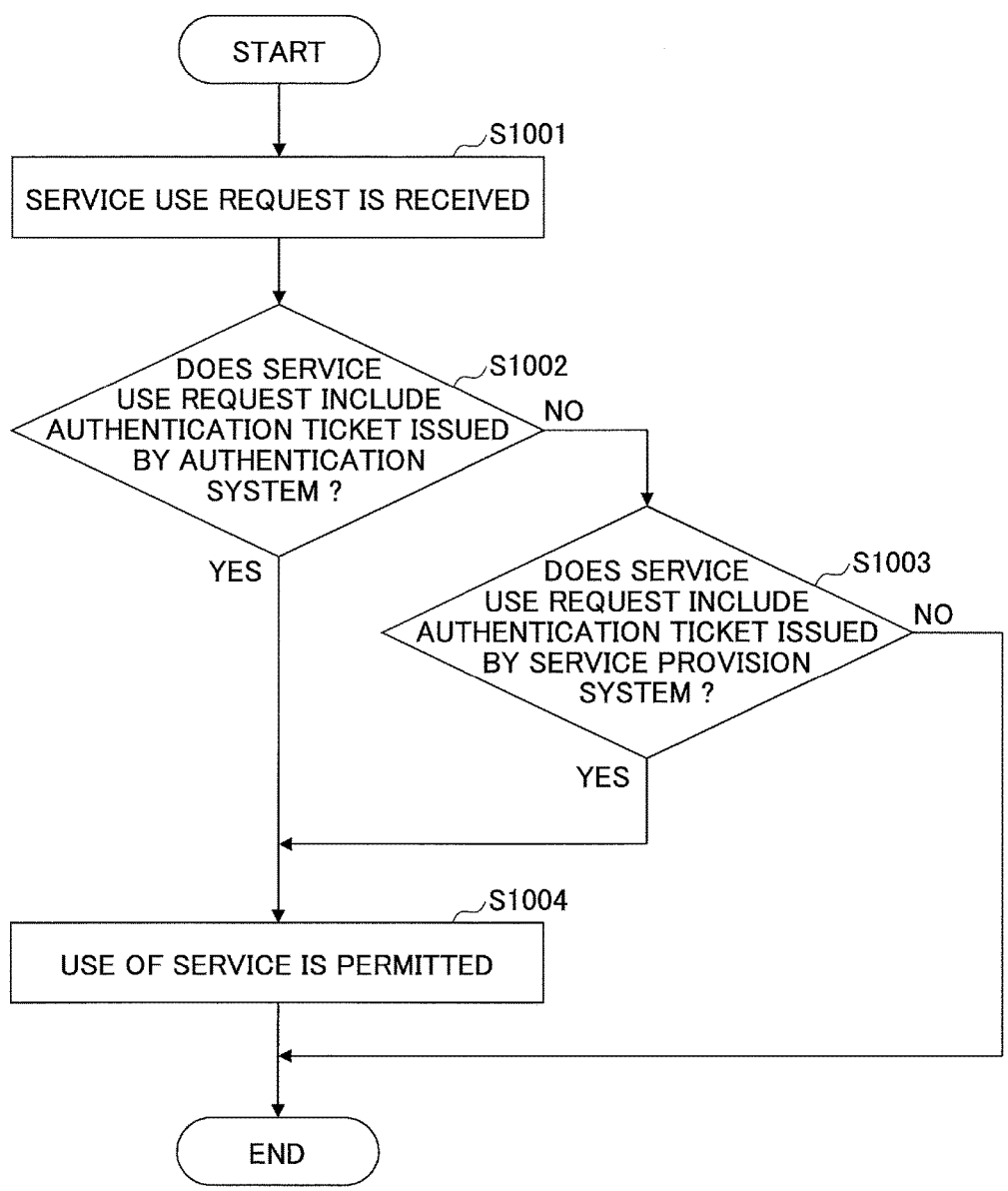
FIG. 10 is a flowchart for explaining an authentication ticket authentication process according to one embodiment.

FIG. 10 is a flowchart for explaining an authentication ticket authentication process according to one embodiment.

As shown in FIG. 10, when a service use request is received from the client device 120 in step S1001, the authentication agent unit 508 of the service provision system 110 sends an authentication request of the service use request to the authentication unit 503.

In step S1002, the authentication unit 503 determines, in response to the received authentication request, whether the service use request includes the first authentication ticket issued by the authentication system 130. When it is determined in step S1002 that the service use request includes the first authentication ticket issued by the authentication system 130, the authentication unit 503 verifies authenticity of the service use request. On the other hand, when the service use request does not include the first authentication ticket issued by the authentication system 130, the authentication unit 503 shifts the process to step S1003.

In step S1003, the authentication unit 503 determines whether the service use request includes the second authentication ticket issued by the service provision system 110. When it is determined in step S1003 that the service use request includes the second authentication ticket issued by the service provision system 110, the authentication unit 503 successfully authenticates the service use request. On the other hand, when the service use request does not include the second authentication ticket issued by the service provision system 110, the process is terminated without permitting the use of the service.

In step S1004, the authentication agent unit 508 of the service provision system 110 permits the use of the service according to the service use request which is successfully authenticated by the authentication unit 503.

It is to be understood that the authentication process of FIG. 10 is exemplary and explanatory and is not restrictive of the invention as claimed. For example, the authentication unit 503 may be configured to perform the determination of step S1002 and the determination of step S1003 in a single step.

By the above-described process of FIG. 10, the client device 120 having obtained the second authentication ticket from the service provision system 110 is able to use the service provided from the service provision system 110 in a manner similar to the case where the first authentication ticket is obtained from the authentication system 130.

Next, a process performed by the information processing system 100 when the client device 120 is implemented by the information terminal 121, and processes performed by the information processing system 100 when the client device 120 is implemented by the electronic device 122 will be described, respectively.

[First Embodiment]

In the first embodiment, the process performed by the information processing system 100 when the client device 120 is implemented by the information terminal 121 will be described.

Figure 11:
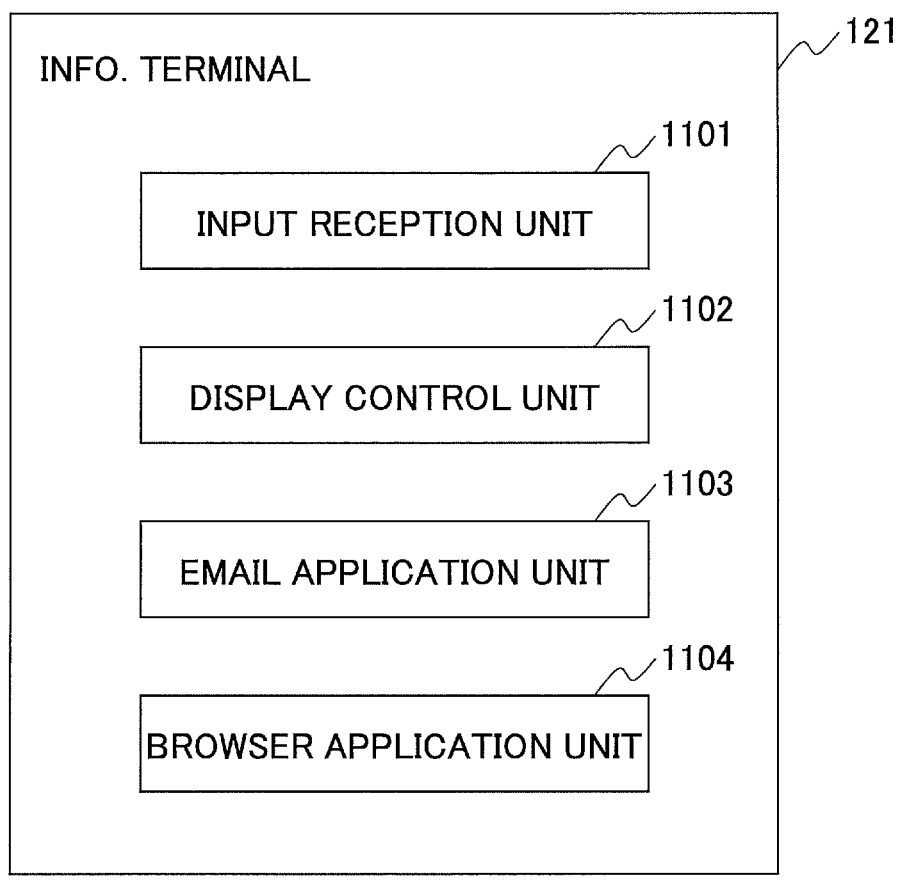
FIG. 11 is a block diagram showing a functional configuration of an information terminal according to a first embodiment.

FIG. 11 shows a functional configuration of an information terminal 121 according to a first embodiment. As shown in FIG. 11, the information terminal 121 includes an input reception unit 1101, a display control unit 1102, an email application unit 1103, and a browser application unit 1104. These units of the information terminal 121 represent functions and units implemented by any of the elements and devices shown in FIG. 2, which are activated by instructions from the CPU 201 based on the programs stored in the ROM 203.

The input reception unit 1101 is configured to receive an input operation performed by the user on the input unit 206 shown in FIG. 2. The display control unit 1102 is configured to control a display operation of the display unit 207 shown in FIG. 2. The email application unit 1103 is configured to receive an email from the email reception server 150 via the network interface 205 shown in FIG. 2. The browser application unit 1104 may be a web browser configured to connect the information terminal 121 with the information terminal portal provided from the service provision system 110.

Figure 12:
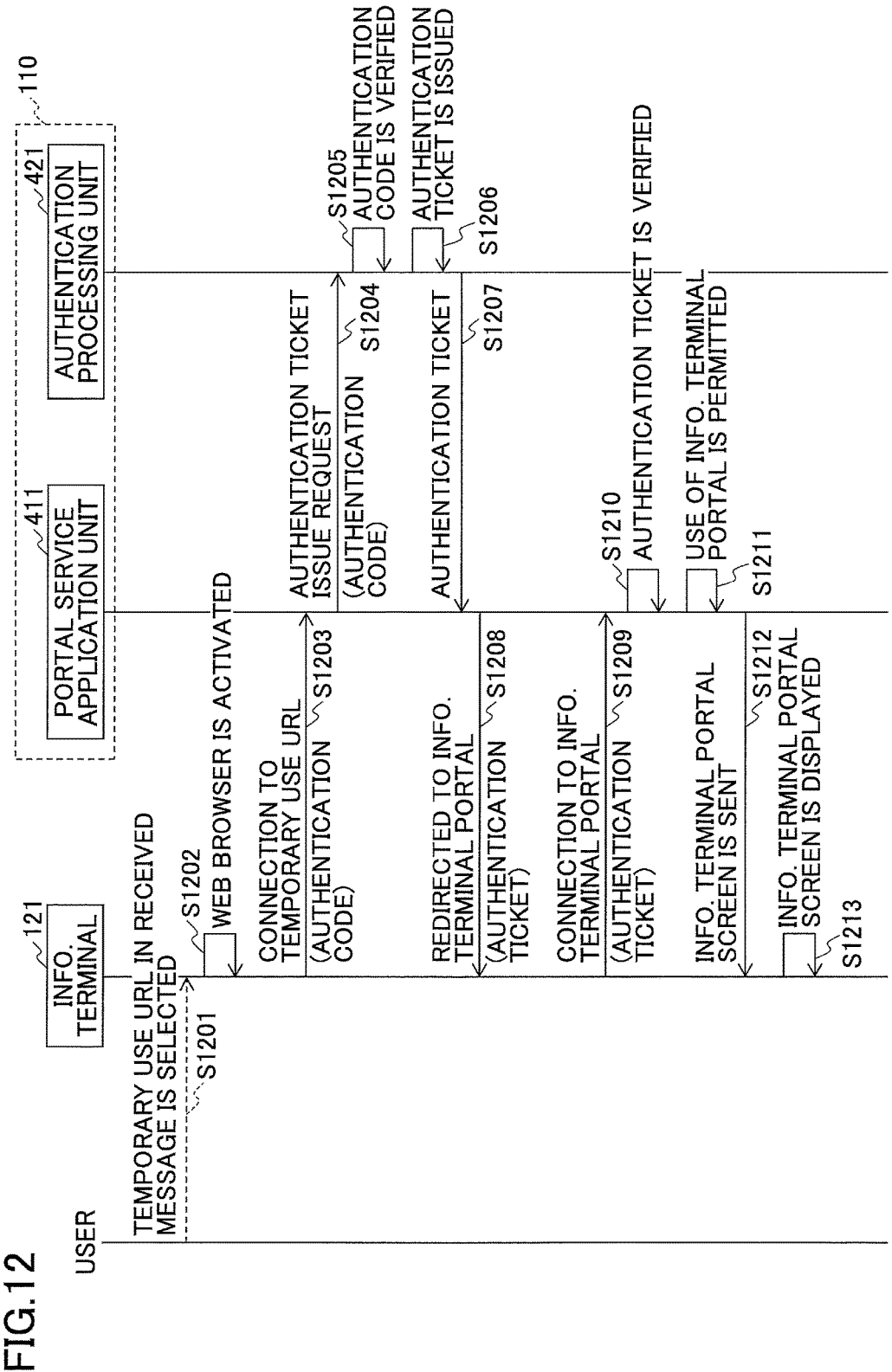
FIG. 12 is a sequence diagram for explaining a process performed by the information processing system according to the first embodiment.

FIG. 12 is a sequence diagram for explaining a process performed by the information processing system 100 according to the first embodiment.

It is assumed that upon startup of the process of FIG. 12, the information terminal 121 receives the message 900 shown in FIG. 9 from the service provision system 110 and displays the received message 900 on the display unit 207. Further, the dotted line in FIG. 12 denotes an input operation by the user.

In step S1201, the user selects the URL 902 for obtaining the second authentication ticket, included in the message 900 displayed on the display unit 207 of the information terminal 121, by clicking or touching the URL 902.

In step S1202, the information terminal 121 starts (or activates) a web browser in response to the received operation of selecting the URL 902.

In step S1203, the information terminal 121 sends to the service provision system 110 a connection request for connection with a temporary use URL of the service provision system 110 by using the web browser. Note that the connection request includes the authentication code (temporary code) generated by the authentication code management unit 501.

In step S1204, the authentication agent unit 508 of the portal service application unit 411 sends an issue request of the second authentication ticket to the authentication processing unit 421 in response to the received connection request to the temporary use URL.

In step S1205, the authentication code management unit 501 of the authentication processing unit 421 verifies the authentication code (temporary code) included in the issue request in response to the issue request of the second authentication ticket. For example, the authentication code management unit 501 may verify the authentication code (temporary code) included in the issue request depending on whether a temporary code consistent with the authentication code included in the issue request is included in the authentication code management information 504 shown in FIG. 7A.

When the authentication code is successfully authenticated in step S1205, the service provision system 110 performs step S1206 and subsequent processing. On the other hand, when the verification of the authentication code ends in failure, the service provision system 110 terminates the process.

In step S1206, the authentication ticket management unit 502 of the service provision system 110 issues a second authentication ticket and stores the information of the issued second authentication ticket in the authentication ticket management information 505.

In step S1207, the authentication processing unit 421 sends a notification of the second authentication ticket issued by the authentication ticket management unit 502 to the portal service application unit 411.

In step S1208, the portal service application unit 411 sends the notification of the second authentication ticket to the information terminal 121 and redirects a connection destination of the web browser of the information terminal 121 to the information terminal portal.

In step S1209, the information terminal 121 causes the web browser to send a connection request to the information terminal portal of the service provision system 110. Note that the connection request includes the second authentication ticket issued at step S1206.

In step S1210, the authentication agent unit 508 of the portal service application unit 411 of the service provision system 110 verifies the second authentication ticket included in the connection request received from the information terminal 121. Note that the processing of this step is equivalent to the processing of steps S1002 and S1003 of FIG. 10.

When the second authentication ticket included in the connection request is successfully authenticated at step S1210, in step S1211, the authentication agent unit 508 of the portal service application unit 411 permits the use of the information terminal portal.

In step S1212, the information terminal portal unit 509 of the portal service application unit 411 transmits an information terminal portal screen to the information terminal 121.

In step S1213, the web browser of the information terminal 121 displays the information terminal portal screen.

According to this embodiment, even when the authentication system 130 stops operation, the user of the information terminal 121 is able to easily use the service provided from the service provision system 110 by selecting the URL of the notification message.

[Second Embodiment]

In the second embodiment, the processes performed by the information processing system 100 when the client device 120 is implemented by the electronic device 122 will be described. In the following, the points which are essentially the same as corresponding points in the above-described first embodiment will be omitted and a description will be given of the points of the second embodiment which are different from those of the above-described first embodiment.

Figure 13:
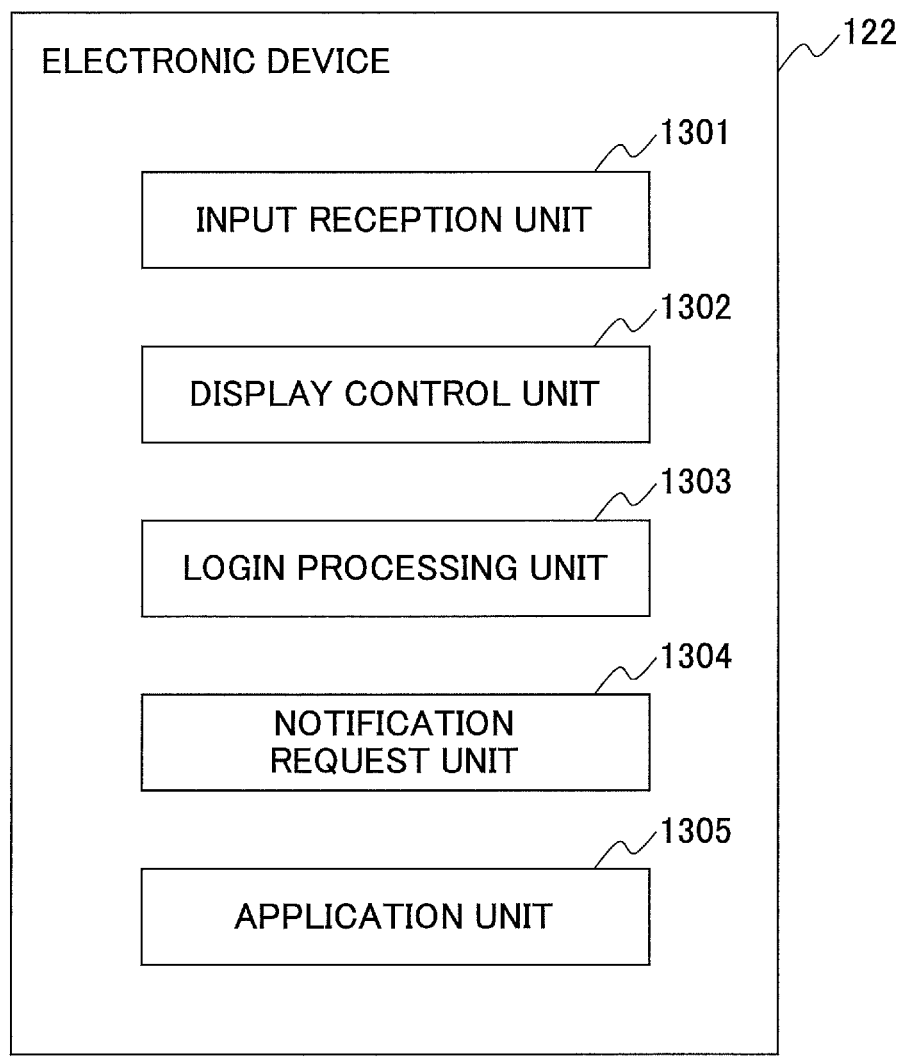
FIG. 13 is a block diagram showing a functional configuration of an electronic device according to a second embodiment.

FIG. 13 shows a functional configuration of the electronic device 122 according to the second embodiment. As shown in FIG. 13, the electronic device 122 includes an input reception unit 1301, a display control unit 1302, a login processing unit 1303, a notification request unit 1304, and an application unit 1305. These units of the electronic device 122 represent functions and units implemented by any of the elements and devices shown in FIG. 3, which are activated by instructions from the CPU 308 based on the programs stored in the ROM 310.

The input reception unit 1301 is configured to receive an input operation performed by the user on the operation unit 307 shown in FIG. 3. The display control unit 1302 is configured to control a display operation of the operation unit 307 of FIG. 3. The login processing unit 1303 is configured to perform a login process to the authentication system 130 or the service provision system 110. The notification request unit 1304 is configured to transmit a notification request to the service provision system 110. The application unit 1305 may be an application program configured to use the service provided from the service provision system 110.

FIG. 14 is a sequence diagram for explaining a process performed by the information processing system according to the second embodiment.

It is assumed that upon startup of the process of FIG. 14, the user of the electronic device 122 receives the message 900 as shown in FIG. 9 from the service provision system 110, and makes a memo of the temporary password 903 included in the message 900. Further, the dotted lines in FIG. 14 denote input operations by the user.

In step S1401, the user of the electronic device 122 performs a display operation of the emergency login screen of the electronic device 122. Note that the emergency login screen may be a login screen for utilizing the service provided from the service provision system 110 by entering the temporary password 903 included in the message 900. In the following, examples of display screens of the electronic device 122 will be described.

FIGS. 15A through 15D show examples of the display screens of the electronic device 122 according to the second embodiment.

Figure 15A:
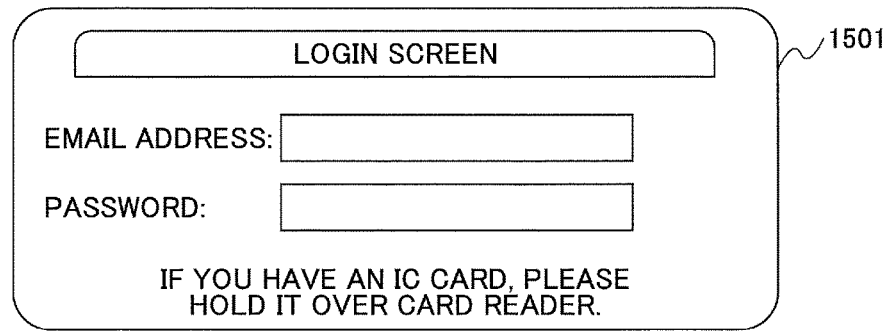
FIGS. 15A through 15D are diagrams showing examples of display screens of the electronic device according to the second embodiment.

FIG. 15A shows an example of a normal login screen 1501. The user is able to log in to the authentication system 130 by entering his email address and password into the login screen 1501. Alternatively, the user may log in to the authentication system 130 by reading the user's authentication information stored in an IC card into the electronic device 122. Note that the login screen 1501 is displayed on the operation unit 307 shown in FIG. 3 by the login processing unit 1303 and the display control unit 1302 shown in FIG. 13.

Figure 15B:
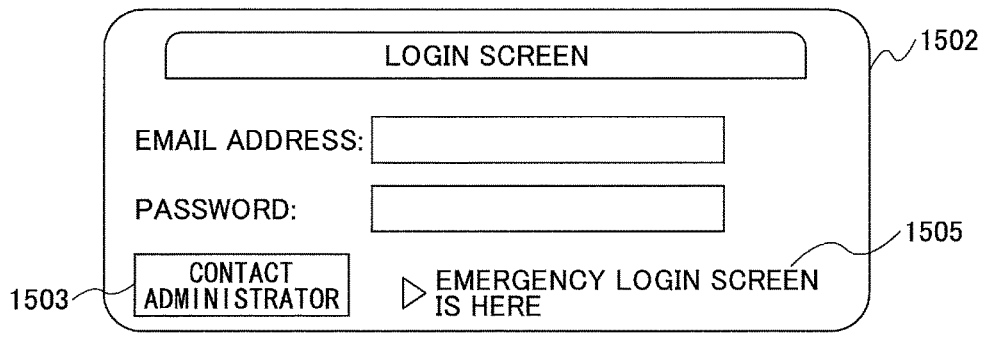

For example, when the login to the authentication system 130 is not permitted, the login processing unit 1303 of the electronic device 122 displays on the operation unit 307 a login screen 1502 as shown in FIG. 15B. In the login screen 1502, a "CONTACT ADMINISTRATOR" button 1503 for contacting the administrator, and a link 1505 for opening the emergency login screen are included.

Figure 15C:
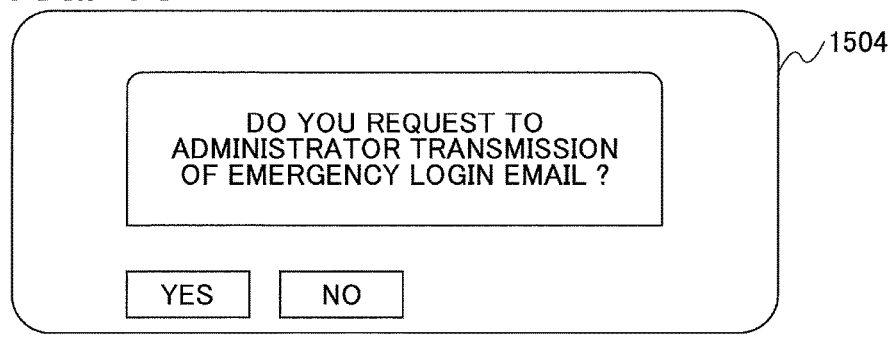

When the "CONTACT ADMINISTRATOR" button 1503 in the login screen 1502 is selected by the user, a screen 1504 for contacting the administrator as shown in FIG. 15C is displayed. When a "YES" button in the screen 1504 for contacting the administrator is selected, the notification message as shown in FIG. 9 may be transmitted to the administrator.

Figure 15D:
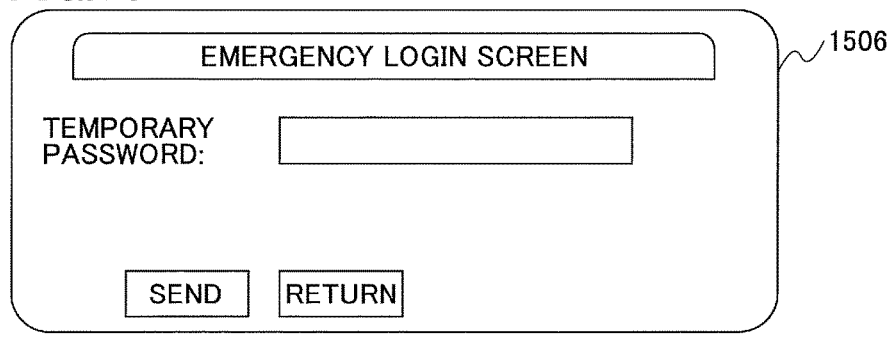

When the link 1505 for opening the emergency login screen in the login screen 1502 is selected by the user, an emergency login screen 1506 shown in FIG. 15D may be displayed.

Referring back to FIG. 14, in step S1402, the electronic device 122 displays the emergency login screen 1506 shown in FIG. 15D on the operation unit 307 shown in FIG. 3.

In step S1403, the user enters the temporary password 903 included in the message 900 into the emergency login screen 1506 and selects a "SEND" button in the emergency login screen 1506. Thereby, the login processing unit 1303 of the electronic device 122 receives the temporary password 903 entered by the user.

In step S1404, the electronic device 122 transmits a device authentication request to the service provision system 110.

In step S1405, the authentication processing unit 421 of the service provision system 110 verifies that the electronic device 122 is a registered device, based on the device information 603 shown in FIG. 6C.

In step S1406, the authentication processing unit 421 transmits device authentication information (device authentication ticket) including a device authentication result to the electronic device 122. In the following description, it is assumed that the electronic device 122 has been successful in the device authentication process. Note that the device authentication process of steps S1404-S1406 may be omitted.

In step S1407, the electronic device 122 transmits an issue request of the second authentication ticket to the service provision system 110. Note that the issue request may include the device authentication information, the tenant information, and the temporary password.

In step S1408, the authentication processing unit 421 of the service provision system 110 identifies the electronic device 122.

In step S1409, the authentication processing unit 421 identifies the tenant of the electronic device 122 based on the tenant information (e.g., the tenant ID).

In step S1410, the authentication processing unit 421 identifies the user based on the temporary password and the authentication code management information shown in FIG. 7A.

Note that the temporary password used in this embodiment has a unique value among the tenant passwords but there may be a case in which the same temporary password is used by other tenants. Hence, the authentication processing unit 421 is required to identify at least the tenant of the electronic device 122 through the processing of steps S1404-S1410. Therefore, as long as it is possible to identify the tenant of the electronic device 122 through the processing of steps S1404-S1410, a part of the processing may be omitted.

In step S1411, the authentication processing unit 421 verifies the authenticity of the temporary password from the electronic device 122 based on the tenant ID and the temporary password in the authentication code management information 504 shown in FIG. 7A. When the temporary password from the electronic device 122 is successfully authenticated, the service provision system 110 performs step S1412 and subsequent steps. On the other hand, when the verification of the temporary password from the electronic device 122 ends in failure, the service provision system 110 terminates the process of FIG. 14. In the following, the process in the case where the temporary password is successfully authenticated will be described.

In step S1412, the authentication processing unit 421 issues the second authentication ticket. In step S1413, the authentication processing unit 421 transmits the issued second authentication ticket to the electronic device 122.

In step S1414, the electronic device 122 transmits a use request of a service (e.g., the electronic device portal) including the second authentication ticket received from the service provision system 110, to the service provision system 110.

In step S1415, the portal service application unit 411 of the service provision system 110 verifies the second authentication ticket included in the received service use request. When the second authentication ticket is successfully authenticated at step S1415, in step S1416, the portal service application unit 411 permits the use of the electronic device portal by the electronic device 122. On the other hand, when the verification of the second authentication ticket ends in failure, the portal service application unit 411 terminates the process of FIG. 14.

By the above-described process, even when the authentication system 130 stops operation, the user of the electronic device 122 is able to easily use the service provided from the service provision system 110 by inputting the temporary password included in the notification message on the electronic device 122.

Next, an administrator notification process will be described. For example, when the login to the authentication system 130 using the login screen 1501 shown in FIG. 15A is not permitted, the login screen 1502 shown in FIG. 15B is displayed on the electronic device 122. By selecting the "CONTACT ADMINISTRATOR" button in the login screen 1502, the user is able to display the screen 1504 shown in FIG. 15C in order to transmit a use information notification request to the administrator.

FIG. 16 is a sequence diagram for explaining an administrator notification process according to the second embodiment.

It is assumed that upon startup of the process of FIG. 16, the login screen 1502 shown in FIG. 15B is displayed on the electronic device 122.

In step S1601, the user performs a display operation to display the screen 1504 shown in FIG. 15C on the electronic device 122 by selecting the "CONTACT ADMINISTRATOR" button 1503 in the login screen 1502.

In step S1602, the electronic device 122 displays the screen 1504 shown in FIG. 15C on the operation unit 307 when the display operation by the user is received.

In step S1603, the user performs a request operation to send a notification request to the administrator by selecting the "Yes" button in the screen 1504.

In step S1604, the notification request unit 1304 of the electronic device 122 sends a use information (e.g., the message 900) notification request to the service provision system 110 when the request operation by the user is received.

In step S1605, the use information notification unit 507 of the service provision system 110 obtains, in response to the use information notification request received from the electronic device 122, the information of administrators in the same tenant based on the data item of the role in the user information 601 shown in FIG. 6A.

In step S1606, the use information notification unit 507 of the service provision system 110 requests the authentication code management unit 501 to generate an authentication code (temporary code) to be sent to the administrator. The authentication code management unit 501 generates the authentication code in response to the request from the use information notification unit 507.

In step S1607, the use information notification unit 507 of the service provision system 110 generates a notification email (e.g., the message 900 shown in FIG. 9) including the authentication code generated by the authentication code management unit 501.

In step S1608, the email transmission unit 425 of the service provision system 110 transmits the notification email generated by the use information notification unit 507 to the administrator via the email transmission server 140.

Note that when two or more administrators in the tenant are detected, the service provision system 110 performs loop processing 1600 of steps S1606-S1608 repeatedly for all the administrators.

When the loop processing 1600 of steps S1606-S1608 is completed, in step S1609, the service provision system 110 sends to the electronic device 122 a process completion notification indicating that the administrator notification process is completed.

By the above-described process, when the authentication system 130 stops operation and the login to the authentication system 130 is not permitted, the user is able to easily request the administrator to transmit the notification message for obtaining the second authentication ticket.

Next, a process in which the notification email including the message 900 is transmitted to the user by the administrator will be described.

Figure 17:
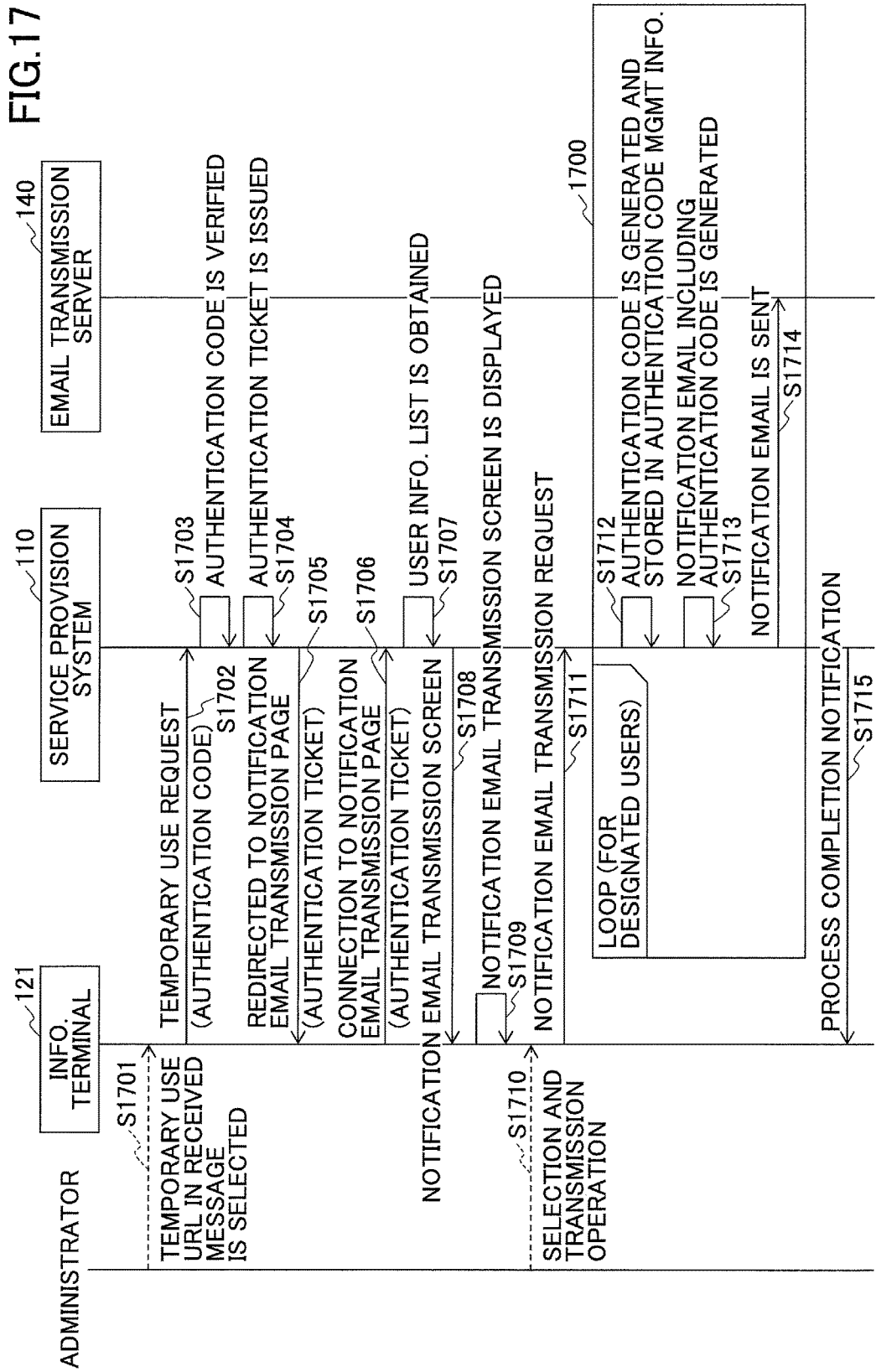
FIG. 17 is a sequence diagram for explaining a user notification process according to the second embodiment.

FIG. 17 is a sequence diagram for explaining a user notification process according to the second embodiment. It is assumed that upon startup of the process of FIG. 17, the notification email transmitted at step S1608 in the process of FIG. 16 is received by the administrator via the email transmission server 140. Further, the dotted lines in FIG. 17 denote input operations by the administrator.

In step S1701, the administrator selects a temporary use URL included in the notification email received from the service provision system 110 in the process of FIG. 16. Note that this notification email includes the URL 902 for obtaining the second authentication ticket, similar to the message 900 shown in FIG. 9. Further, this URL 902 includes the authentication code (temporary code) for obtaining the second authentication ticket.

In step S1702, the information terminal 121 transmits to the service provision system 110 a temporary use request including the authentication code, when the input operation by the administrator to select the temporary use URL is received.

In step S1703, the service provision system 110 verifies the authentication code included in the temporary use request received from the information terminal 121. When the authentication code is successfully authenticated, the service provision system 110 shifts the process to step S1704. On the other hand, when the verification of the authentication code ends in failure, the service provision system 110 terminates the user notification process.

In step S1704, the service provision system 110 issues the second authentication ticket.

In step S1705, the service provision system 110 transmits the issued second authentication ticket to the information terminal 121 and redirects a connection destination to a notification email transmission page.

By the above-described processing, even when the administrator forgets his user ID and password for logging in to the service provision system 110, the administrator is able to easily open a notification email transmission screen. It is to be understood that this processing is exemplary and explanatory and is not restrictive of the invention as claimed. For example, when the login to the service provision system 110 using the user ID and password is permitted, the administrator may use the user ID and password to log in to the service provision system 110 and may open the notification email transmission screen.

In step S1706, the information terminal 121 is connected to the notification email transmission page of the service provision system 110. Note that this connection request includes the second authentication ticket issued at step S1704.

In step S1707, the use information notification unit 507 of the service provision system 110 obtains a user information list from the user information 601 when the connection request to the notification email transmission page including the second authentication ticket is received from the information terminal 121.

In step S1708, the use information notification unit 507 of the service provision system 110 transmits a notification email transmission screen including the user information list to the information terminal 121.

In step S1709, the information terminal 121 displays the notification email transmission screen received from the service provision system 110. An example of the notification email transmission screen displayed on the information terminal 121 at this time is shown in FIG. 18.

Figure 18:
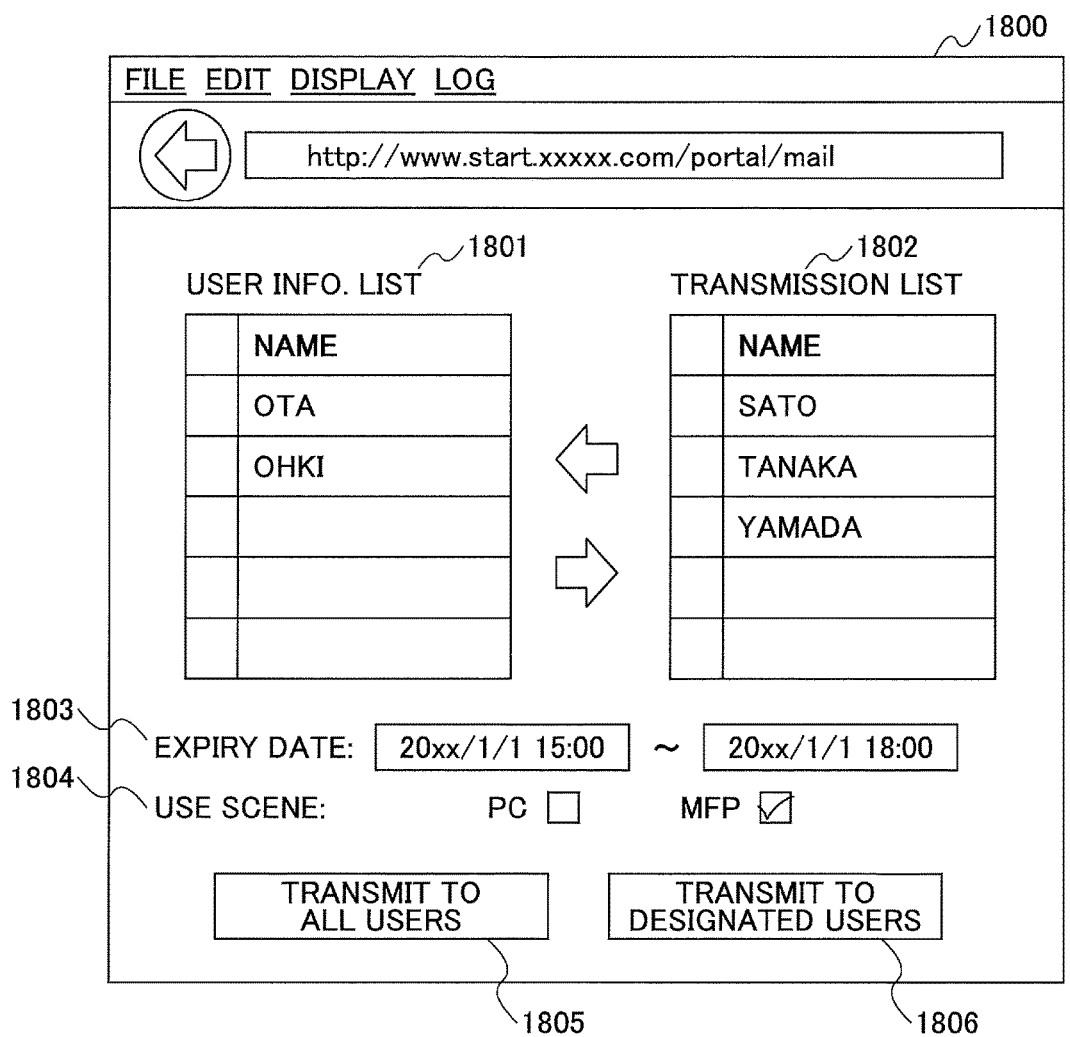
FIG. 18 is a diagram showing an example of a notification email transmission screen according to the second embodiment.

FIG. 18 shows an example of the notification email transmission screen according to the second embodiment. As shown in FIG. 18, the notification email transmission screen 1800 includes a user information list 1801, a transmission list 1802, an expiry date 1803, a use scene 1804, a "TRANSMIT TO ALL USERS" button 1805, and a "TRANSMIT TO DESIGNATED USERS" button 1806.

The administrator may transmit selectively a notification email to the designated users by selecting users from the user information list 1801, registering the selected users in the transmission list 1802, and pressing the "TRANSMIT TO DESIGNATED USERS" button 1806. Further, the administrator may transmit a notification email to all the users included in the user information list 1801 by pressing the "TRANSMIT TO ALL USERS" button 1805.

Further, the administrator may set up the start date and time from which the authentication code (temporary code, temporary password) becomes available, and the end date and time after which the authentication code (temporary code, temporary password) is no longer available, by entering desired values into the input columns of the expiry date 1803. It is preferable that the start date and time and the end date and time are set up beforehand by default values.

Further, the administrator may determine a type of the authentication code to be issued by selecting one or both of "PC" and "MFP" check boxes of the use scene 1804.

For example, when both the "PC" and "MFP" check boxes of the use scene 1804 are selected, the URL 902 including the temporary code and the temporary password 903 are included in the message 900 sent to the user. When only the "PC" check box of the use scene 1804 is selected, only the URL 902 including the temporary code is included in the message 900 sent to the user. Similarly, when only the "MFP" check box of the use scene 1804 is selected, only the temporary password 903 is included in the message 900 sent to the user.

Referring back to FIG. 17, in step S1710, the administrator sets up (or selects) the required data items in the notification email transmission screen 1800 shown in FIG. 18 and performs a transmission operation.

In step S1711, the information terminal 121 transmits a notification email transmission request including the data items set up by the administrator to the service provision system 110.

In step S1712, the authentication code management unit 501 of the service provision system 110 generates the designated authentication code (temporary code, temporary password) and stores the information of the generated authentication code in the authentication code management information 504.

In step S1713, the use information notification unit 507 of the service provision system 110 generates a notification email (e.g., the message 900 of FIG. 9) including the authentication code generated by the authentication code management unit 501.

In step S1714, the email transmission unit 425 of the service provision system 110 transmits the generated notification email to the email address of the user.

Note that two or more designated users are included in the notification email transmission request, the service provision system 110 performs loop processing 1700 of steps S1712-S1714 repeatedly for all the designated users.

When the loop processing of steps S1712-S1714 is completed, in step S1715, the service provision system 110 sends a process completion notification to the information terminal 121.

By the above-described process, the administrator is able to easily transmit to the user the notification email including the authentication code for obtaining the second authentication ticket.

[Third Embodiment]

In the third embodiment, a case in which the electronic device 122 further includes a monitoring unit configured to monitor a state of the authentication system 130 will be described.

Figure 19:
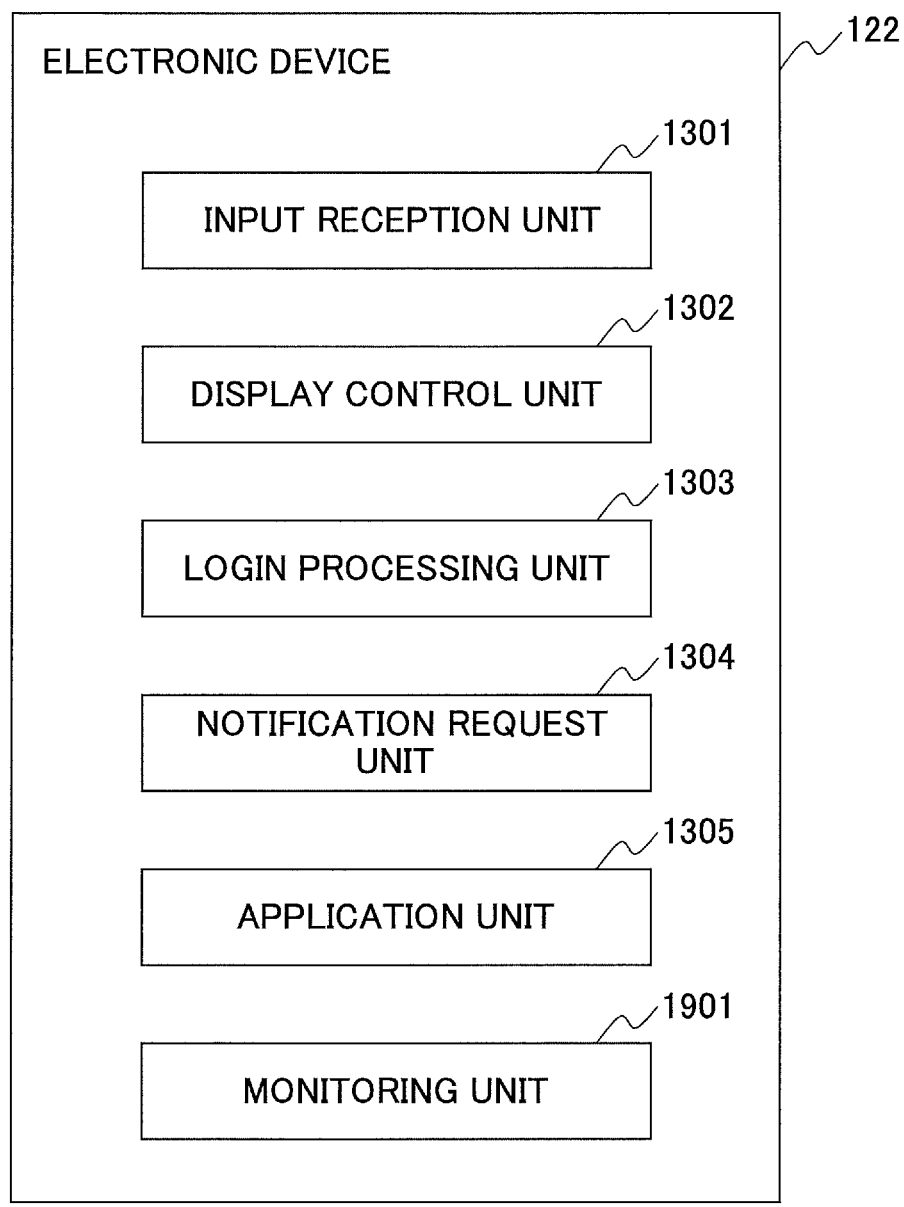
FIG. 19 is a diagram showing a functional configuration of an electronic device according to a third embodiment.

FIG. 19 is a block diagram showing a functional configuration of the electronic device 122 according to the third embodiment. As shown in FIG. 19, the electronic device 122 includes a monitoring unit 1901 in addition to the units 1301-1305 of the electronic device according to the second embodiment shown in FIG. 13. The units 1301-1305 of the electronic device 122 of the third embodiment are essentially the same as corresponding units of the electronic device of the second embodiment shown in FIG. 13, and a description thereof will be omitted.

The monitoring unit 1901 is configured to monitor a state of the authentication system 130. For example, when a problem arises in the state of the authentication system 130, the monitoring unit 1901 sends a notification of the problem to the service provision system 110.

For example, each time an error such as a communication error is detected when the user logs in to the authentication system 130, the monitoring unit 1901 may increment the number of failed login attempts, and send a notification of a problem to the service provision system 110 when the number of failed login attempts exceeds a predetermined threshold. In this case, it is preferable that login attempts having failed due to the input of wrong passwords are not counted in the number of failed login attempts.

Alternatively, the monitoring unit 1901 may be configured to perform periodically a confirmation procedure (e.g., polling) to the authentication system 130 at intervals of a predetermined time (e.g., one minute) and send a notification of a problem to the service provision system 110 when a no-response state of the authentication system 130 is continued over a predetermined period (e.g., 10 minutes).

Figure 20B:
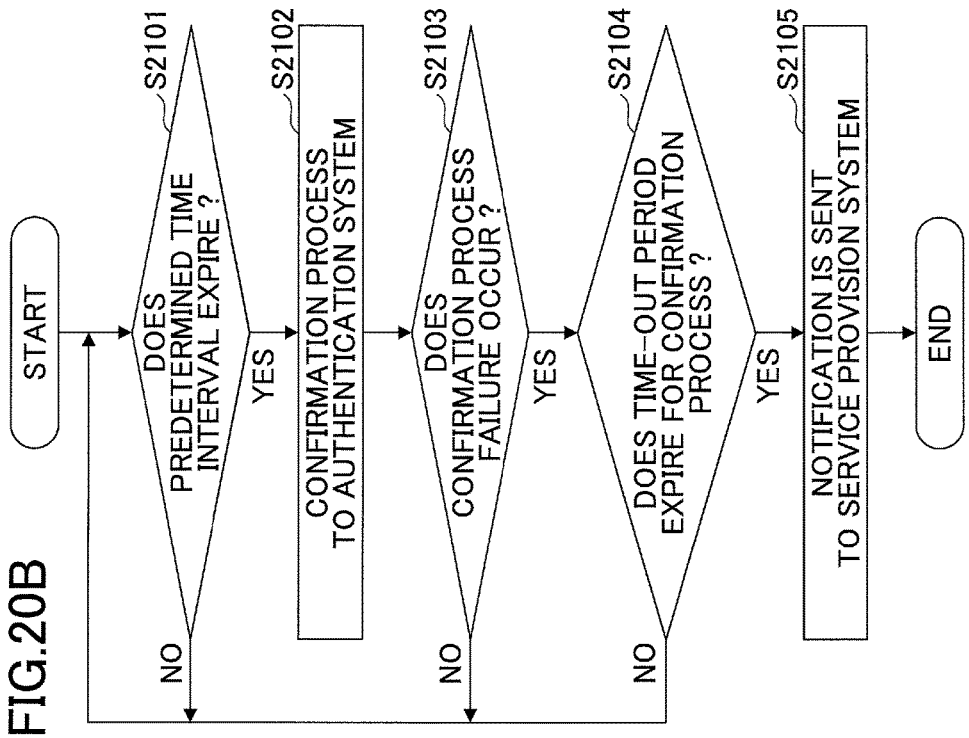
FIGS. 20A and 20B are flowcharts for explaining monitoring processes performed by the electronic device according to the third embodiment.
Figure 20A:
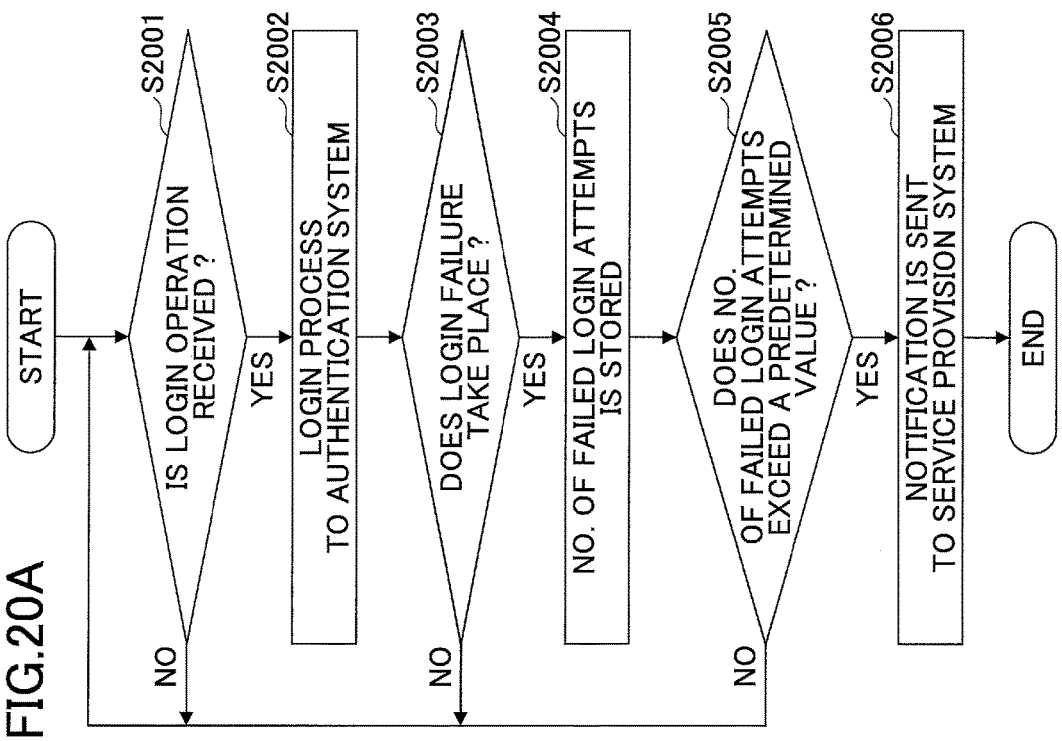

FIG. 20A and FIG. 20B are flowcharts for explaining monitoring processes performed by the electronic device 122 according to the third embodiment.

FIG. 20A shows a monitoring process in which the electronic device 122 sends a predetermined notification to the service provision system 110 based on the number of failed login attempts.

In step S2001, the electronic device 122 starts processing of step S2002 and subsequent steps when a login operation by the user is received.

In step S2002, the electronic device 122 performs a login procedure to the authentication system 130 by using authentication information input by the user.

In step S2003, the monitoring unit 1901 of the electronic device 122 determines whether the login procedure ends in failure due to an error such as a communication error. When it is determined at step S2003 that the login procedure ends in failure due to the error, the monitoring unit 1901 shifts the monitoring process to step S2004. On the other hand, when it is determined at step S2003 that the login procedure does not end in failure (i.e., when the login procedure is successful or when the login attempt fails due to other errors, such as the input of wrong passwords), the monitoring unit 1901 shifts the monitoring process to step S2001 and repeats the above processing.

In step S2004, the monitoring unit 1901 of the electronic device 122 increments the number of failed login attempts and stores the resulting number of failed login attempts.

In step S2005, the monitoring unit 1901 of the electronic device 122 determines whether the number of failed login attempts exceeds a predetermined value (e.g., 10). When the number of failed login attempts is less than the predetermined value, the monitoring unit 1901 shifts the monitoring process to step S2001 and repeats the above processing. On the other hand, when the number of failed login attempts exceeds the predetermined value, the monitoring unit 1901 shifts the monitoring process to step S2006. In step S2006, the monitoring unit 1901 sends the predetermined notification to the service provision system 110.

FIG. 20B shows a monitoring process in which the electronic device 122 performs periodically a confirmation procedure to the authentication system 130 at intervals of a predetermined time.

In step 2101, the monitoring unit 1901 of the electronic device 122 shifts the process to step S2102 when the predetermined time (e.g., one minute) has elapsed.

In step S2102, the monitoring unit 1901 of the electronic device 122 performs the confirmation procedure to the authentication system 130. This confirmation procedure may be a login procedure, or may be a procedure for detecting a predetermined state of the authentication system 300.

In step S2103, the monitoring unit 1901 of the electronic device 122 determines whether the confirmation procedure of step S2102 ends in failure. When the confirmation procedure of step S2102 ends in failure, the monitoring unit 1901 shifts the process to step S2104. On the other hand, when the confirmation procedure of step S2102 is successful, the monitoring unit 1901 shifts the process to step S2101 and repeats the above processing.

In step S2104, the monitoring unit 1901 of the electronic device 122 determines whether the failure of the confirmation procedure is continued over a predetermined period (e.g., 10 minutes). When it is determined at step S2104 that the failure is continued over the predetermined period, in step S2105, the monitoring unit 1901 sends the predetermined notification to the service provision system 110. On the other hand, when it is determined at step S2104 that the failure is not continued over the predetermined period, the monitoring unit 1901 shifts the process to step S2101 and repeats the above processing.

Note that in the above monitoring processes of FIGS. 20A and 20B, the notification sent to the service provision system 110 may be a notification indicating that the authentication system 130 has stopped, or a notification indicating an issue request of the message 900 to the administrator.

By the above-described processes, the electronic device 122 is able to send to the service provision system 110 a notification indicating the predetermined state of the authentication system 130 without receiving the input operation by the user.

As described in the foregoing, the service provision system 110 according to one embodiment is configured to provide a predetermined service based on first authentication information issued by the external first authentication unit 130. In this service provision system 110, a notification unit (the use information notification unit 507) is configured to send to a user of the predetermined service a notification of third authentication information for obtaining second authentication information different from the first authentication information. An issue unit (the authentication ticket management unit 502) is configured to issue the second authentication information in response to an issue request of the second authentication information including the third authentication information. A second authentication unit (the authentication unit 503, the authentication agent unit 508) is configured to verify authenticity of a use request of the predetermined service including either the first authentication information or the second authentication information.

Accordingly, it is possible to provide the service provision system 110 which is adapted to easily provide a predetermined service to the user even when the authentication system 130, which is configured to issue the authentication information required for the use of the predetermined service, stops operation.

The service provision system according to the present invention is not limited to the above-described embodiments, and variations and modifications may be made without departing from the scope of the invention.

What is claimed is:

1. A service provision system comprising:
memory storing computer-readable instructions; and
one or more processors configured to execute the computer-readable instructions such that the one or more processors are configured to perform operations including,
providing a predetermined service to a terminal connected to the service provision system to receive the predetermined service, based on first authentication information issued to the terminal by an external first authentication unit,
sending to the terminal receiving the predetermined service a notification of third authentication information for obtaining second authentication information different from the first authentication information,
issuing the second authentication information in response to an issue request that includes the third authentication information, from the terminal, of the second authentication information, and
when the first authentication information is received from the terminal, verifying authenticity of a use request of the predetermined service based on the first authentication information, and
when the second authentication information is received from the terminal, verifying authenticity of a use request of the predetermined service based on the second authentication information.

2. The service provision system according to claim 1, wherein the one or more processors are further configured to send a notification including a message with the third authentication information to an account of a user of the terminal.

3. The service provision system according to claim 2, wherein the account of the user is represented by an email address of the user.

4. The service provision system according to claim 2, wherein the message includes URL information indicating an address of a web page for receiving the issue request of the second authentication information.

5. The service provision system according to claim 4, wherein the third authentication information is predetermined identification information included in the URL information.

6. The service provision system according to claim 5, wherein the third authentication information includes a string of characters having a length smaller than a length of the predetermined identification information included in the URL information.

7. The service provision system according to claim 2, wherein the message includes identification information which identifies the first authentication unit.

8. The service provision system according to claim 1, wherein the second authentication information is in a format identical to a format of the first authentication information.

9. An information processing system comprising:
the service provision system according to claim 1; and
an electronic device configured to communicate with the service provision system,
wherein the electronic device comprises memory storing computer-readable instructions, and one or more second processors to execute the computer-readable instructions such that the one or more second processors are configured to perform operations including,
sending to the service provision system a notification request of the third authentication information for obtaining the second authentication information different from the first authentication information when the electronic device is unable to obtain the first authentication information from the external first authentication unit.

10. An information processing system comprising:
the service provision system according to claim 1; and
an electronic device configured to communicate with the service provision system,
wherein the electronic device comprises memory storing computer-readable instructions, and one or more second processors to execute the computer-readable instructions such that the one or more second processors are configured to perform operations including
monitoring a state of the external first authentication unit which issues the first authentication information, and sending a notification of the state of the external first authentication unit to the service provision system.

11. The service provision system according to claim 1, wherein the external first authentication unit is remote from and connected to the service provision system via a network and the second authentication information is sent to the terminal from the service provision system.

12. An information processing apparatus for use in a service provision system which provides a predetermined service based on first authentication information issued by an external first authentication unit, the information processing apparatus comprising:
memory storing computer-readable instructions; and
one or more processors configured to execute the computer-readable instructions such that the one or more processors are configured to perform operations including,
sending to a user of a terminal receiving the predetermined service a notification of third authentication information for obtaining second authentication information different from the first authentication information,
issuing the second authentication information in response to an issue request that includes the third authentication information, from the terminal, of the second authentication information including the third authentication information, and when the first authentication information is received from the terminal, verifying authenticity of a use request of the predetermined service based on the first authentication information, and when the second authentication information is received from the terminal, verifying authenticity of a use request of the predetermined service based on the second authentication information.

13. The information processing system according to claim 12, further comprising sending to the terminal receiving the predetermined service a notification of third authentication information for obtaining second authentication information different from the first authentication information when the predetermined service has stopped.

14. A service provision method performed by an information processing system which provides a predetermined service based on first authentication information issued by an external first authentication unit, the service provision method comprising:

sending to a user of a terminal receiving the predetermined service a notification of third authentication information for obtaining second authentication information different from the first authentication information;

issuing the second authentication information in response to an issue request that includes the third authentication information, from the terminal, of the second authentication information including the third authentication information; and when the first authentication information is received from the terminal, verifying authenticity of a use request of the predetermined service based on the first authentication information, and when the second authentication information is received from the terminal, verifying authenticity of a use request of the predetermined service based on the second authentication information.

* * * * *